(12) United States Patent
Menzel et al.

(10) Patent No.: US 11,604,502 B2
(45) Date of Patent: Mar. 14, 2023

(54) SYSTEMS AND METHODS FOR INTELLIGENT ALARM GROUPING

(71) Applicant: Schneider Electric USA, Inc., Andover, MA (US)

(72) Inventors: Johannes Menzel, Eybens (FR); Mark Kowal, Saanichton (CA)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 17/044,934

(22) PCT Filed: Apr. 4, 2019

(86) PCT No.: PCT/US2019/025754
§ 371 (c)(1),
(2) Date: Oct. 2, 2020

(87) PCT Pub. No.: WO2019/195532
PCT Pub. Date: Oct. 10, 2019

(65) Prior Publication Data
US 2021/0165476 A1  Jun. 3, 2021

Related U.S. Application Data

(60) Provisional application No. 62/788,367, filed on Jan. 4, 2019, provisional application No. 62/785,311, filed (Continued)

(51) Int. Cl.
*G06F 1/28* (2006.01)
(52) U.S. Cl.
CPC ...................................... *G06F 1/28* (2013.01)
(58) Field of Classification Search
CPC .......................................................... G06F 1/28
See application file for complete search history.

(56) References Cited

U.S. PATENT DOCUMENTS 9,229,042 B2  1/2016  Higgins
9,692,258 B2  6/2017  Saarinen et al.
(Continued)

FOREIGN PATENT DOCUMENTS

CN  102210126 A  10/2011
CN  106021063 A  10/2016
(Continued)

OTHER PUBLICATIONS

International Search Report and Written Opinion dated Jul. 9, 2019 in International Application Serial No. PCT/US2019/025754, 10 pp.
(Continued)

*Primary Examiner* — Zahid Choudhury
(74) *Attorney, Agent, or Firm* — Locke Lord LLP

(57) ABSTRACT

In accordance with an embodiment, a method and system are provided to create and analyze grouped events. The method and system involve obtaining, at a network node, event data of measured real events detected at one or more locations of a monitored system according to a first criterion. The event data for each real event defines one or more parameters/dimensions of the real event. The method and system further involve aggregating the detected real events into groups according to at least one or more parameters/dimensions of the detected real events, and analyzing one or more of the aggregated groups of detected events to identify conditions on the monitored system or take action when a condition is identified from the one or more aggregated groups of tracked events. The tracked real events may include an alarm event as well as a system event.

30 Claims, 22 Drawing Sheets

Related U.S. Application Data on Dec. 27, 2018, provisional application No. 62/652,748, filed on Apr. 4, 2018.

(56) References Cited

U.S. PATENT DOCUMENTS

| | | | |
|---|---|---|---|
| 2002/0018545 A1* | 2/2002 | Crichlow | H04L 67/12 |
| | | | 379/106.03 |
| 2005/0273281 A1* | 12/2005 | Wall | G01D 4/004 |
| | | | 702/60 |
| 2012/0284790 A1 | 11/2012 | Bhargava | |
| 2012/0290230 A1* | 11/2012 | Berges Gonzalez | |
| | | | G05B 19/0428 |
| | | | 702/61 |
| 2013/0046884 A1* | 2/2013 | Frost | G06F 9/06 |
| | | | 709/224 |
| 2013/0311977 A1* | 11/2013 | Nieminen | G06F 11/3672 |
| | | | 717/135 |
| 2015/0089027 A1* | 3/2015 | Zweigle | H02J 13/0006 |
| | | | 709/219 |
| 2021/0103006 A1* | 4/2021 | Menzel | G01R 31/56 |

FOREIGN PATENT DOCUMENTS

| | | |
|---|---|---|
| CN | 106406858 A | 2/2017 |
| CN | 106600298 A | 4/2017 |
| WO | 2011104661 A1 | 9/2011 |

OTHER PUBLICATIONS

Chinese First Office Action and Search Report dated Nov. 11, 2021 for Chinese Patent Application No. 201980033469.6, 11 pages.

Extended European Search Report and Written Opinion dated Nov. 10, 2021 for European Patent Application No. 19782174.7-1202, 7 pages.

Chinese Intellectual Property Search Report of 2nd Office Action dated Apr. 1, 2022 for corresponding CN Patent Application No. 201980033469.6 with English Language Translation, 26 pages.

* cited by examiner

| INCIDENT HISTORY - ALL POWER QUALITY INCIDENTS | |
|---|---|
| SAG (15 ALARMS) ↑<br>15 DEVICES PRODUCTION.BOTTLING, LV. TRANSFORMER 16B, HC_LIFE SAFETY.MAIN_PM, HC_EQUIPMENT.MAIN_PM, PRODUCTION CLEANINPLACE, LV.TRANSFORMER 15B, PRODUCTION PREPARATION, LV.TRANSFORMER15, HC_NON_ESSENTIAL.MAIN_PM, HC_CRITICAL. MAIN_PM, PRODUCTION. WAREHOUSE, LV.TRANSFORMER16A, UTILITY.MAIN, HC.MAIN_PM, PRODUCTION.INCOMER | • DURATION: 2.5 s |
| SWELL (15 ALARMS) ↓<br>15 DEVICES PRODUCTION PREPARATION, HC_NON_ESSENTIAL_MAIN_PM, LV. TRANSFORMER15, LV.TRANSFORMER15B, PRODUCTION, CLEANINPLACE, HC_EQUIPMENT.MAIN_PM,HC_CRITICAL.MAIN_PM, LV.TRANSFORMER16A, PRODUCTION. WAREHOUSE, HC.MAIN_PM, UTILITY.MAIN, PRODUCTION. INCOMER, PRODUCTION. BOTTLING, HC_LIFE_SAFETY.MAIN_PM, LV.TRANSFORMER16B | • DURATION: 1,202 s |
| SAG (15 ALARMS) ↑<br>15 DEVICES HC.MAIN PM, LV. TRANSFORMER16B, HC_LIFE SAFETY.MAIN_PM, HC_PRODUCTION. BOTTLING, HC_EQUIPMENT.MAIN.PM, PRODUCTION.CLEANINPLACE, LV.TRANSFORMER15B, PRODUCTION PREPARATION, LV.TRANSFORMER15, HC_NON_ESSENTIAL.MAIN_PM, HC_CRITICAL.MAIN_PM, PRODUCTION. WAREHOUSE, LV.TRANSFORMER16A, UTILITY.MAIN, PRODUCTION.INCOMER | • DURATION: 2.6 s |
| TRANSIENT(3 ALARMS-MAX 167% V) ↑<br>3 DEVICE HC.MAIN_PM, UTILITY.MAIN, PRODUCTION.INCOMER | • DURATION: INSTANT |
| SAG (15 ALARMS) ↓<br>15 DEVICES PRODUCTION.BOTTLING, LV. TRANSFORMER16B, HC_LIFE SAFETY.MAIN_PM, HC_EQUIPMENT.MAIN_PM, LV. TRANSFORMER15B, PRODUCTION. CLEANINPLACE, HC_NON_ESSENTIAL.MAIN_PM, PRODUCTION. PREPARATION, LV.TRANSFORMER15, PRODUCTION. WAREHOUSE, HC_CRITICAL.MAIN_PM, LV. TRANSFORMER16A, HC.MAIN_PM, PRODUCTION. INCOMER, UTILITY. MAIN | • DURATION: 2.5 s |
| TRANSIENT (3 ALARMS - MAX 169%V) ↑<br>3 DEVICES HC. MAIN_PM, UTILITY, MAIN, PRODUCTION INCOMER | • DURATION: INSTANT |
| TRANSIENT (3 ALARMS- MAX 155% V) ↑<br>3 DEVICES PRODUCTION.INCOMER, UTILITY.MAIN, HC.MAIN_PM | • DURATION: INSTANT |
| TRANSIENT (3 ALARMS-MAX 172% V) ↑<br>3 DEVICES HC MAIN_PM, PM UTILITY.MAIN, PRODUCTION. INCOMER | • DURATION: INSTANT |
| TRANSIENT (3 ALARMS-MAX 129% V) ↑<br>3 DEVICES PRODUCTION.INCOMER, UTILITY.MAIN, HC.MAIN_PM | • DURATION: INSTANT |

FIG. 9

SYSTEMS AND METHODS FOR INTELLIGENT ALARM GROUPING

CROSS-REFERENCE TO RELATED APPLICATIONS

The present application claims priority to U.S. Provisional Application Ser. No. 62/652,748 which was filed on Apr. 4, 2018, U.S. Provisional Application Ser. No. 62/785,311 which was filed on Dec. 27, 2018 and U.S. Provisional Application Ser. No. 62/788,367 which was filed on Jan. 4, 2019, all of the applications of which are incorporated by reference herein in their entirety.

FIELD

The present disclosure is generally directed to intelligent events and alarms groupings and analysis in an automation control and metering environment.

BACKGROUND

The changing world of energy is making it increasingly challenging to optimize power reliability, energy costs, and operational efficiency such as in critical power environments (e.g., hospitals, data centers, airports, and manufacturing facilities). Utility power grids are becoming more dynamic and facility power distribution systems are becoming more complex and sensitive to power quality issues due to increasing electronic control devices, threatening network stability. Competitive pressures and environmental regulations are pushing expectations for energy efficiency and business sustainability higher than ever. Addressing these challenges requires new digital tools designed specifically to enable faster response to opportunities and risks related to electrical/power system reliability and operational stability.

Power quality disturbances are a primary cause of unexpected business downtime and equipment malfunction/damage/failure. According to some estimates, power quality disturbances are responsible for 30-40% of business downtime, and power quality problems cost companies roughly 4% of their annual revenue. Examples of the detrimental effects to equipment that may be attributed to power quality disturbances include overheating of equipment components (e.g., motors, capacitors, cables, transformers, etc.), accelerated wear and tear, premature aging of equipment components, malfunctions and mis-operations, and erroneous circuit breaker or relays operations.

The economic impact produced by power quality disturbances may include increased energy bills, additional financial penalties (e.g., penalties as a result of power disruption), and potentially detrimental impacts on the environment (e.g., increased carbon footprint). Power quality disturbances may also adversely result in increased charges related to demand, increases in electrical/power system losses, and increases in voltage drops. Three examples of areas that are influenced by power quality disturbances include: uptime, asset condition, and energy efficiency. For example, system uptime may be affected by electrical installations intentionally or inadvertently being removed from service due to voltage sags, interruptions, and/or undervoltage/overvoltage conditions. Moreover, nuisance trips of circuits caused by harmonics, voltage swells, or transients may also lead to reduced uptime. Assets (e.g., cables, transformers, capacitor banks, etc.) may be detrimentally affected by power quality disturbances or conditions. For instance, overheating of equipment, an unplanned change in design characteristics, and/or a decreased service life are just a few impacts caused by power quality anomalies. Finally, the efficient use of energy is also affected by power quality disturbances.

According to a specific example, capacitor banks may be affected by power quality disturbances (e.g., harmonics) which are characterized as a steady-state distortion of the voltage and/or current signals. Non-linear power loads from electric arc furnaces (EAFs), electric railways, thyristor-based voltage and frequency modifying devices have become primary harmonic sources in a power grid. These systems inject large amounts of harmonic currents into the power system, leading to distortion of the fundamental current signal in the power grid. Harmonics may adversely impact the normal operations of capacitor banks in numerous ways (e.g., increasing power losses, producing harmonic resonance, increasing harmonic currents, and reducing the service life of the capacitor bank through additional heating).

Proper collection and interpretation of events, alarms, power quality data and other associated data about the system (e.g., contextual data from manufacturing process SCADA, building management system (BMS) and the user interactions, user defined priority levels, etc.) may allow for both businesses and energy providers to discriminate useful information from collected events, improve electrical/power system operations, recovery time and efficiency, and limit detrimental effects from power quality disturbances and other undesirable conditions on the electrical/power system or facilities. Energy procurement managers may use power quality data to identify and avoid penalties or to revise/update energy contracts. Likewise, maintenance engineers may use power quality data to properly diagnose equipment issues and improve root cause analysis and reduce equipment downtime.

A big difficulty arises from the amount of data being reported at a system level when an event impacts the whole site, or an important part of the electrical/power system. The first case happens when the voltage sag comes from the utility (e.g., it is picked up by all the sites meters which have PQ capabilities). The second occurs when a voltage sag is generated from within the system (e.g., a motor start and capacitor bank energizing as 2 examples among others). The impact of this second case may spread to part of the site only. But in both of these cases, at a system level (e.g., edge computer such as a Power SCADA system or a Power Monitoring historian, . . . or at a cloud computing system such as an analytics engine), the system may be flooded by hundreds of events flowing in a very short duration (e.g., when 850 events are reported at this system level, within 2 seconds). This amount of information would overwhelm any user. The user could not even see what is happening if the user simply looks at the screen while all these alarms roll up the screen in 2 seconds.

A second difficulty arises from the different nature of event data, e.g., between Real events (RE) and additional Enriching Event Information (EEI). The Real Events (RE) are detected by the IED or any other system node. One of the characteristics allowing the identification of a Real Event is that it often has a start time stamp and an end time stamp. Thus, a duration may be derived within the IED or by any of the network nodes. Another characteristic may be that it matches a defined list of Real Events (e.g., the typical types of Power Quality events detected by any PQ enabled IED such as in a PM7650, and ION8xxx or 9xxx from Schneider Electric, etc.). Any one, or any combination of the previously mentioned characteristics of a Real Event is sufficient to declare an event as a Real Event type. The additional Enriching Event Information type of event data (EEI) thus does not meet any of the previously defined criteria for identifying a Real Event. An Enriching Event Information, as used herein, can be any data which provides additional information to the Real Events (e.g., measurements, calculations, inferences, status changes, links, descriptions, contextual data, etc.). The additional Enriching Event Information type of event data (EEI) could be further sub-divided into distinctions between what enriching information/measurement is detected, measured, inferred or calculated within the IED (e.g., Disturbance Direction Detection aka "DDD" which is additional information calculated inside the IED, providing the probable source location of a sag upstream or downstream of the IED, as well as other measurements and characteristics such as among other possible examples, a digital or analog IO status change on same IED detecting a motor start) from the Electrical/Power system enriching information/measurement which may be detected, measured, inferred or calculated at a system level (e.g., alarm acknowledgement, or else among many other possible examples, using the known electrical hierarchy to deduce power flows, etc.) as well as distinguish these previous categories from other systems derived enriching information/measurement which may be detected, measured, inferred or calculated at any system and level (e.g., by correlating to a running process or status change of a specific process tracked/driven by a Manufacturing SCADA, or an HVAC operation monitored or driven by a Building Management System, as two examples among many others).

A third, more specific difficulty arises with event related textual descriptions (e.g., event labels) due to the diversity of semantics (e.g., "V1 sag" or "Phase 1 voltage sag" or "V1 dip", all meaning the same thing). This diversity of semantics (e.g., naming conventions) occurs even between product ranges. And this is worse for systems where several manufacturers are being used, each having its own "event labeling" semantics.

SUMMARY

In accordance with an exemplary embodiment, a method and system are provided to analyze events and additional event information to create and then analyze grouped events and to reduce the amount of data (e.g., event related information and amount of reported events) and to group and expose and process homogeneous data (e.g., having sorted these into homogeneous power quality issue types, whatever textual event labels they may originally be tagged as). The method and system involve obtaining, at a network node, event data of measured real events (in some cases, measured events which include real events) detected at one or more locations of a monitored system according to a first criterion. The measured event data (e.g., voltage and/or current waveform capture) is used for each real event to define one or more parameters (e.g., voltage sag magnitude, short circuit current, duration of event, etc.) of the real event. The method and system further involve aggregating the events into groups according to at least one or more parameters (also called characteristics, or called dimensions in the data science and analytics field) of the detected real events or any other additional Enriching Event Information type of event data, and analyzing one or more of the aggregated groups of detected events on the monitored system to identify conditions on the monitored system or to take action from the analysis of the one or more aggregated groups of detected events or to simplify a presentation of the event data and events and groups of events. The detected events may include an alarm event as well as any other system event (e.g., an alarm acknowledgement as one example among others) as well. The action to be taken may include but is not limited to shutting down one or more electrical equipment in the monitored system, selectively interrupting power at one or more locations in the monitored system, or generating an alarm or report.

The parameters/dimensions of an event group may include at least one of identification information of a Real event time of occurrence, a duration of an event, a voltage measurement, a current measurement, a power factor, a criticality of an event, a type of an event including a type of power quality event and/or other parameters (e.g. user settings, etc.) and/or any additional Enriching Event Information type of event data (e.g., associated manufacturing process SCADA data, associated BMS data, etc.).

The detected real events may be aggregated into groups according to a time and duration of the detected real events. The aggregating operation may involve identifying real events and all additional Enriching Event Information overlapping in time, and grouping of these events (RE & EEI) together to form one or more event groups each having event group data defining one or more parameters/dimensions of the event group. The one or more groups may be displayed in graphical form on a time line. The aggregating operation may also involve applying a predefined or calculated or derived extra time duration before or after one or more of the detected real events or aggregated groups of detected real events to account for time alignment when grouping events according to the time and duration.

The method and system may further involve detecting and tracking an occurrence of a real event using power equipment at a location in the monitored system according to a first criterion (e.g., any PQ event threshold or condition as one example among others), generating event data as well as optionally creating at least one event group inside the IED or power equipment or location in the monitored system, which is based on one or more parameters/dimensions of the detected event data (from RE & EEI). The event data may be obtained from a single and/or a plurality of different sources comprising at least one or a plurality of intelligent electronic devices or any other power equipment arranged to monitor energy measurements, as well as on any node of the monitored system at different locations. The event data also may include textual data describing one or more parameters/dimensions of the detected real event (e.g., the "alarm label").

The method and system may further involve converting the textual data of each event (real event data as well as any possibly associated enriching event information) to a common format and using consistent semantics (e.g., calling "v1" the same as "voltage phase 1"). The system may then for one or more tagged event labels identify one or more parameters/dimensions of the detected event prior to aggregating into one group. The conversion of the textual data may thus involve extracting discriminant parameters/dimensions from the textual data of an event and/or of any enriching event information, and creating new event data for the grouped event, which comprises tagged event labels for the extracted discriminant parameters/dimensions. Furthermore, the method and system may involve converting the textual data from the event data of each detected real event or from additional enriching event information data collected or measured or derived by an intelligent electronic device or other power equipment, or by any other electrical/power system or other system node, to a matching label from a digital repository/library of unique and non-ambiguous event labels identifying one or more parameters/dimensions associated with one or more of the detected real events prior to aggregating the detected real events.

In accordance with an exemplary embodiment, the present disclosure contemplates a system for intelligent alarm grouping that includes a control node and a network node logically coupled to the control node. The network node may detect an alarm event when the alarm event meets a first criterion. The detected alarm event may be reported at the control node when the detected alarm event meets a second criterion. At the control node, the reported alarm event may be grouped with other similar events and/or with other data and used to identify alarm event patterns (e.g. "weekly, on Sundays, at 17 h") and/or associations (e.g., a strong correlation between one type of event and some actions inside the BMS such as turning "on" a HVAC rooftop unit).

Additional objects and advantages will be set forth in part in the description which follows, and in part will be obvious from the description, or may be learned by practice of the present disclosure and/or claims. At least some of these objects and advantages may be realized and attained by the elements and combinations particularly pointed out in the appended claims.

It is to be understood that both the foregoing general description and the following detailed description are exemplary and explanatory only and are not restrictive of the invention, as disclosed or claimed. The claims should be entitled to their full breadth of scope, including equivalents.

DESCRIPTION OF THE FIGURES

The description of the various example embodiments is explained in conjunction with the appended drawings.

FIG. 9 illustrates an example Incident report showing grouped Alarm events for each Incident in accordance with an exemplary embodiment of the present disclosure.

DISCUSSION OF EXAMPLE EMBODIMENTS

Method and systems are provided to identify real events, as well as identify what event data is "enriching event information" and to aggregate them into event groups according to one or more parameters/dimensions. The real events as well as the "enriching event information" may be aggregated (or clustered) together by time into groups or sub-groups for further analysis and action.

These and other example features of the present disclosure will be described below in further detail with reference to the figures.

I. Network System Architecture

Figure 1:
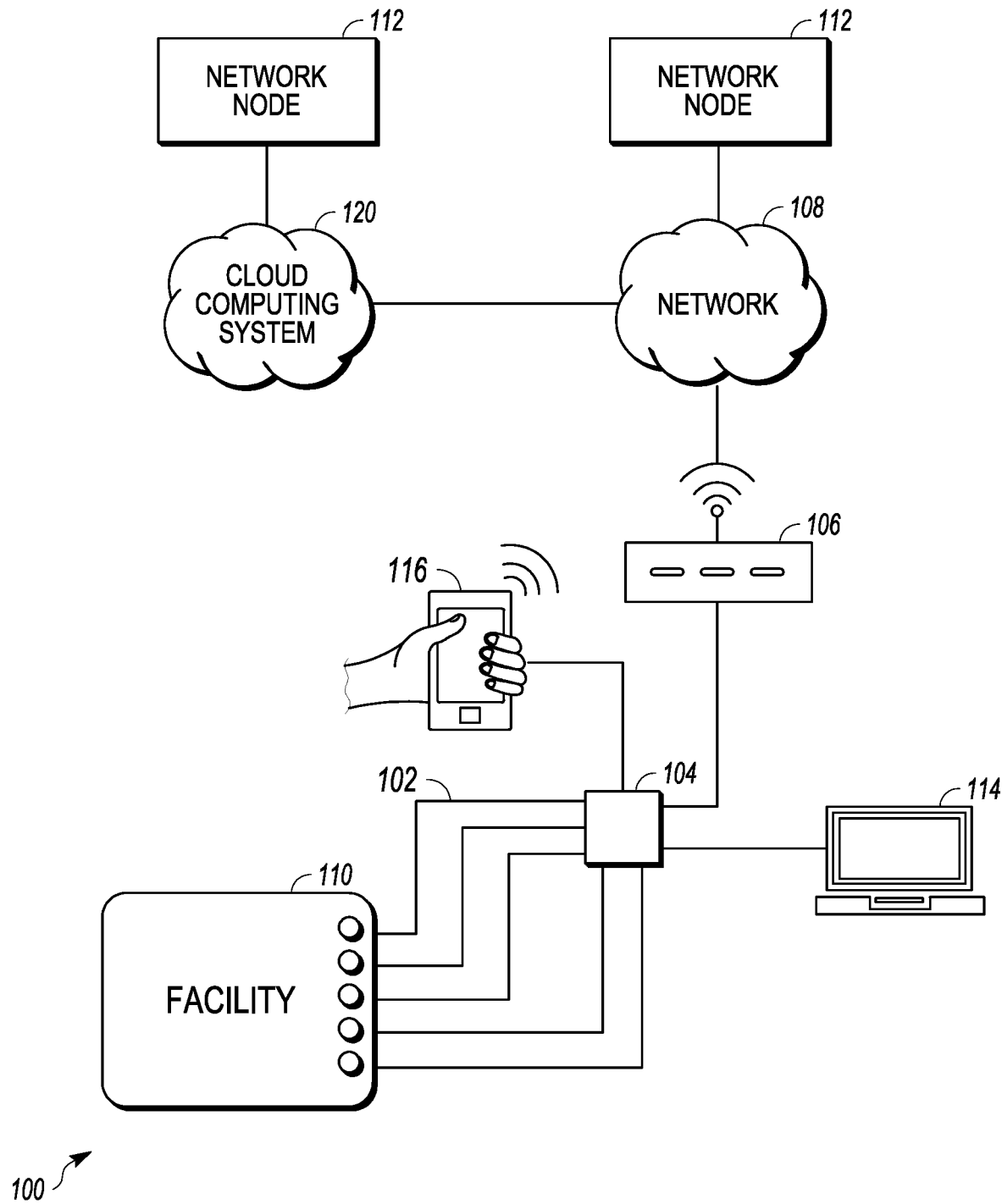
FIG. 1 is a schematic view of an exemplary network system configured to intelligently group real events at a network node in accordance with an exemplary embodiment of the present disclosure.

Referring to FIG. 1, there is depicted a schematic view of an exemplary network system architecture 100 configured to perform among other things intelligent event analysis, event grouping and analysis of these groupings. The network system architecture 100 includes one or more nodes (e.g., a network node(s) 112, a control node(s) 104) which interacts with computer systems (e.g., user devices 114 and 116) and the facility (e.g., 110) and its components or equipment. The control node(s) 104 may communicate across the network 108 via a gateway or edge device 106. The network and control nodes (e.g., 112, 104) and/or the computer systems (e.g., user devices 114 and 116) and/or the gateway or edge device (e.g., 106) are configured to monitor and/or detect and/or calculate and/or infer other measured, calculated and/or derived data related to the electrical/power system or facility, to analyze the events and associated data, and to identify/detect real events and enriching events information, group events and take action in relations to the detected real events and/or event groups. The actions may include generating a report or alarm, selectively controlling the power system, facility or components thereof (e.g., interrupting or turning off power at one or more locations, selectively controlling operations of equipment at the facility, etc.). An operator may monitor the electrical/power system and facility 110 via user devices 114 or 116, which may include customizing, receiving, filtering and viewing reports and notification such as for detected real events and event data, and grouped real events and group data in various formats (e.g., graphical report such as graphs or on a map view of the electrical/power system and facility, or text-based report). The operator may also take action to control the power system, facility or components thereof through the user devices 116 and 114. The facility 100 may be among many other possible examples, an automated industrial facility or include automated industrial equipment and/or processes, which is powered by the power system.

The systems and devices in the network architecture 100 may use a local area network (LAN), wide area network (WAN), or internetwork (including the Internet) to communicate over a communication network 108. The communication network 108 may be a wired and/or wireless network that uses, for example, physical and/or wireless data links to carry network data among (or between) the network nodes.

Each network node 112 may include a computer system (e.g., an intelligent electronic device (IED), computer, server or other smart system) to sense, monitor, capture and analyze energy-related (e.g., voltage and/or current) data as well as any derived, calculated, and/or inferred data (e.g., power, power factor, frequency, among others) on the electrical/power system or system-related data from the facilities and their equipment. In accordance with the various embodiments, the network node 112 may monitor and capture signal waveforms representative of voltage and/or current and/or other measurable electrical property on the electrical/power system using one or more sensors (e.g., voltage or current sensor(s)), perform event analysis to identify power events and additional information using the waveforms, and perform other operations as part of the waveform capture and event analysis described herein. The network node 112 may be a smart power meter, IED or other power equipment or facility equipment.

The network architecture 100 may include a plurality of network nodes 112 arranged at different upstream and downstream positions in a hierarchical relationship on the electrical/power system to monitor and share power-related information (e.g., measurement data, event data and additional information, results of event analysis, event profiles, etc.) at any desired position along the power system, including positions along the grid, between the utility and a facility, and within the facility. Each control network node may also include a computer system.

The network architecture 100 shown in FIG. 1 is simply provided as an example. Any suitable network architecture may be used, which allows for communication and interaction between a control node, a network node(s), user device(s), facilit(ies), monitoring devices (e.g., meters or other equipment) to perform the operations described herein. For example, the system and method herein, including but not limited to the detection, aggregation and analysis of real events, can be implemented through a cloud-based architecture via one or more network nodes, e.g., a Cloud computing system 120.

As used herein, an IED can be a computational electronic device optimized to perform a particular function or set of functions. Examples of IEDs can include smart utility meters, power quality meters, and other metering devices. IEDs may also be imbedded in variable speed drives (VSDs), uninterruptible power supplies (UPSs), circuit breakers, relays, transformers, or any other electrical apparatus IEDs may be used to perform monitoring and control functions in a wide variety of installations. The installations may include utility systems, industrial facilities, warehouses, office buildings or other commercial complexes, campus facilities, computing co-location centers, data centers, power distribution networks, and the like. For example, where the IED is an electrical power monitoring device, it may be coupled to (or be installed in) an electrical power distribution system and configured to sense and store data as electrical parameters representing operating characteristics (e.g., voltage, current, waveform distortion, power, etc.) of the power distribution system. These parameters and characteristics may be analyzed by a user or a computer system to evaluate potential performance, reliability or power quality-related issues. The IED may include at least a controller (which in certain IEDs can be configured to run one or more applications simultaneously, serially, or both), firmware, a memory, a communications interface, and connectors that connect the IED to external systems, devices, and/or components at any voltage level, configuration, and/or type (e.g., AC, DC). At least certain aspects of the monitoring and control functionality of an IED may be embodied in a computer program that is accessible by the IED.

In some embodiments, the term "IED" as used herein may refer to a hierarchy of IEDs operating in parallel and/or tandem. For example, an IED may correspond to a hierarchy of energy meters, power meters, and/or other types of resource meters. The hierarchy may comprise a tree-based hierarchy, such a binary tree, a tree having one or more child nodes descending from each parent node or nodes, or combinations thereof, wherein each node represents a specific IED. In some instances, the hierarchy of IEDs may share data or hardware resources and may execute shared software.

II. Event Analysis

1. Event

An event, such as a power quality (PQ) event, may be detected and categorized by monitoring, identifying, capturing and analyzing measured and/or derived data (e.g., waveforms, of voltage and/or current signals and/or derived electrical property such as power factor, real power, reactive power, as examples among others) on an electrical/power system using one or more sensors. These operations may be performed on a computer system (e.g., a smart power meter or other intelligent electronic device (IED) on the power system). The measurement data is captured when an event is detected/triggered (e.g., when a threshold, rule or condition or other criterion or combination thereof is satisfied or violated). The event detection thresholds, rules or conditions, may be derived from norms, local or utility related regulations or from best practices, from industry segment (e.g., food & beverage, semi-conductors manufacturing, oil & gas, etc.) specific standards, best practices or recommendations. A waveform(s) from the start to the terminus of the event (e.g., the event waveform) may be captured, and analyzed to identify relevant representative elements (generally referred to as "parameters" in the power domain, but also referred to as "characteristics" or "dimensions" (of analysis) in the data science domain) (e.g., magnitude of the electrical property, harmonics, power factor, duration of the event, event severity, disturbance direction detection (DDD), criticality or priority of an event, an alarm event or other event characteristics including PQ characteristics, etc.). The event severity may be derived by calculating for instance the "magnitude*duration" or any similar or more complex indicator which may be representative of the event or useful for later calculations and analysis. The event may also be enriched with additional derived data such as the DDD (disturbance direction detection, implemented in Schneider Electric IED/Power Meters such as CM4 k, 7650, ION 8 k and 9 k) which may be calculated within the IED and associated to the event to show for example at each meter's level if the event most probably occurred upstream or downstream of the meter. The PQ type of the event may also be determined (e.g., a voltage sag, a voltage swell, a voltage interruption or outage, a voltage transient, a voltage unbalance, voltage and/or current harmonic distortion, voltage flicker, current transient, an abnormal frequency variation, and any other energy related events type). The data for detected event(s) may be reported to other computer systems, which are part of a monitoring system in the network architecture (see, e.g., FIG. 1) such as a network node(s), a control node(s) or other intelligent electronic devices (e.g., power meters or other power equipment, network node(s) or control node(s).

In accordance with an embodiment, a power meter may continuously log or measure electrical properties on the power system (e.g., voltage and/or current and/or other measurable property) using a high frequency continuous filling buffer. The power meter may then keep only those measurement data (e.g., waveform(s)) that are captured based on event detection. Events may be detected using absolute thresholds, such as absolute voltage (e.g., measuring 20 kV in which anything going 10% above or below the nominal voltage is captured). The thresholds may be adapted and changed based on received data, calculated or derived data (e.g., loads loss impacts detected by analyzing the waveform) or other factors (e.g., either specific industry standards/recommendations or a site specific setting which may vary based on, for example, a critical application that needs monitoring). Sites that may require increased sensitivity may trigger thresholds earlier. Sites, which are not so stringent, may trigger thresholds later. For example, for an insensitive process, the threshold may be set closer to a magnitude of 75% rather than triggering at a magnitude of 90% because that is where a tripping risk may lie. Thus, a power meter may be selectively configured to continuously log or measure and capture waveforms based on defined thresholds or triggers or other parameters. (This derived setting, for example, may be also associated with a real event, as enriching event information.) The measured voltage or current or power or RMS of current may be evaluated against a threshold to detect a start of an event and to initiate a wave capture operation. This approach may be applied at different levels/layers with triggers being set for different levels/layers, and may be an extension of alarm events. A power meter(s) may act as a collection module for collecting data points (e.g., power event data and additional information), and may be provided at different locations, levels or layers along a power distribution system (e.g. at a data center, a hospital sub-system, room level, building level, system level, etc.). A power meter may collect reporting data from one or more locations, levels or layers. The collected information, which may be further processed, may be sent to a computer or control network node. The power meter itself may also be configured to act as the computer or control node and may be connected directly to the cloud. In a distributed network system architecture, analysis of event elements may happen at the meter, and the calculations and analysis may happen at any layer, e.g., at the meter, at an edge device, in the box, at the network monitoring level (e.g., a software tracking real time power on the system, or in the cloud), or the various operations may be distributed between different systems and devices in a network.

The analysis on each waveform is something that may be localized. For example, analysis or interpretation that is performed at the system level may be pushed down into the power meter so that each sub-calculation runs according to the closest upper node or lower nodes. A digital repository/library may be provided for smart alarms as well as for triggers. Such a digital repository/library may collect all the event information, thresholds, settings, enriching information and groups related information and sort or store it and may map any event or other information or measurement (including the waveform captures) against it. The waveform analysis may disaggregate the parameters/dimensions of what happened before, during the event, and after the event. All three may be compared using the digital repository/library or against themselves. On detection of changes (e.g., what happened between, before and after), the signal between what was there before the event is compared to what happened/what is there after the event to determine additional information related to the detected event (e.g., actions surrounding the event such as source change, tripping or power interruption upstream or downstream, short circuit, reactive or inductive load, etc.). This again may be an example of enriching event information, deduced from waveform analysis.

Power meters may be employed to capture measurement data at different positions, levels or layers for a site (e.g., a hospital or a university campus). For example, a main power meter may mirror the utility side, and other meters may be placed to capture and report data, including captured waveforms, for critical locations. The data provided by these power meters may be analyzed together, e.g., waveforms captured around a particular time period or event(s), to provide a more detailed picture of the state of the electrical/power system and of any detected event. The measured, captured, and analyzed data also may be tagged by the power meter to facilitate processing thereof, (e.g., a part of a phase, a type of associated waveform, voltage, current, power, reactive power, etc.), and also mapped to a particular meter. Thus location (geographical or inside the electrical hierarchy) may be a key input to aggregating events together (so it may be one of the system derived enriching information, used to aggregate events). Tags may also be employed to categorize priority, locality (e.g., local or system), importance or any other dimension. The power meters may be part of a larger monitoring system, which may be implemented through a cloud to provide for event and alarm reporting by analyzing data from the power meters and other cloud services. The data collected from all of the meters can, for example, be provided to the cloud or other network component for further processing, which may entail pooling, correlating and analyzing the data and reporting the data to a user or other system. Digital repository/library updates may be pushed to the power meters for use in performing analysis of measurement data or data calculated or derived therefrom.

The data for each event may include event time and/or duration, event magnitude, meter name, PQ type classification (e.g., as calculated by a meter), impact, worst phase, severity, location and other relevant measurable, calculated and/or derived data for the event. It should be noted that power meters are simply provided as an example of an intelligent electronic device (IED), which may be configured to monitor and detect an event and generate and collect data associated with the event. Other computer systems or devices may likewise be configured to implement the operations described herein.

2. Event Analysis

Events and their event data may be generated and collected from various sources, including power meters and other equipment. Each event may be pre-processed to identify a "real event" versus "enriching event information", in order to mine for relevant discriminant parameters/dimensions, to rectify or correct corrupted or missing information in the event data, to address format issues including tagging the event with relevant information, and to perform other pre-processing operations. In various embodiments, the real events may have a start and end time. After pre-processing the events, the real events may be classified into specific types of events (e.g., Alarm events) according to defined criterion, which may be stored in one or more digital repositories/libraries. Although real events provide information regarding the monitored system, each real event may be a symptom or part of a larger anomaly on the monitored system. Accordingly, to obtain a more detailed understanding of the operations of the system and to reduce the amount of data given the number of events/alarms that may occur per day or other period, the real events may be further aggregated into groups according to one or more parameters/dimensions. In one example, events may be identified from the collected real events, and grouped together. The events may be events which overlap in time and satisfy other parameters/dimension criterion. Other parameters/dimensions individually or in combination may be used to aggregate real events into different event groups, or sub-groups of the different groups. The events and event groups may be tagged (e.g., defining strings as one implementation among others), analyzed to identify common characteristics or any anomalies within this group or comparing this group to others, and possibly to identify their probable sources (e.g., "causes"), and to take appropriate action. Examples of the pre-processing and processing related to event analysis and aggregation are described below with references to FIGS. 2 through 7.

A. Pre-Process Event

Figure 2:
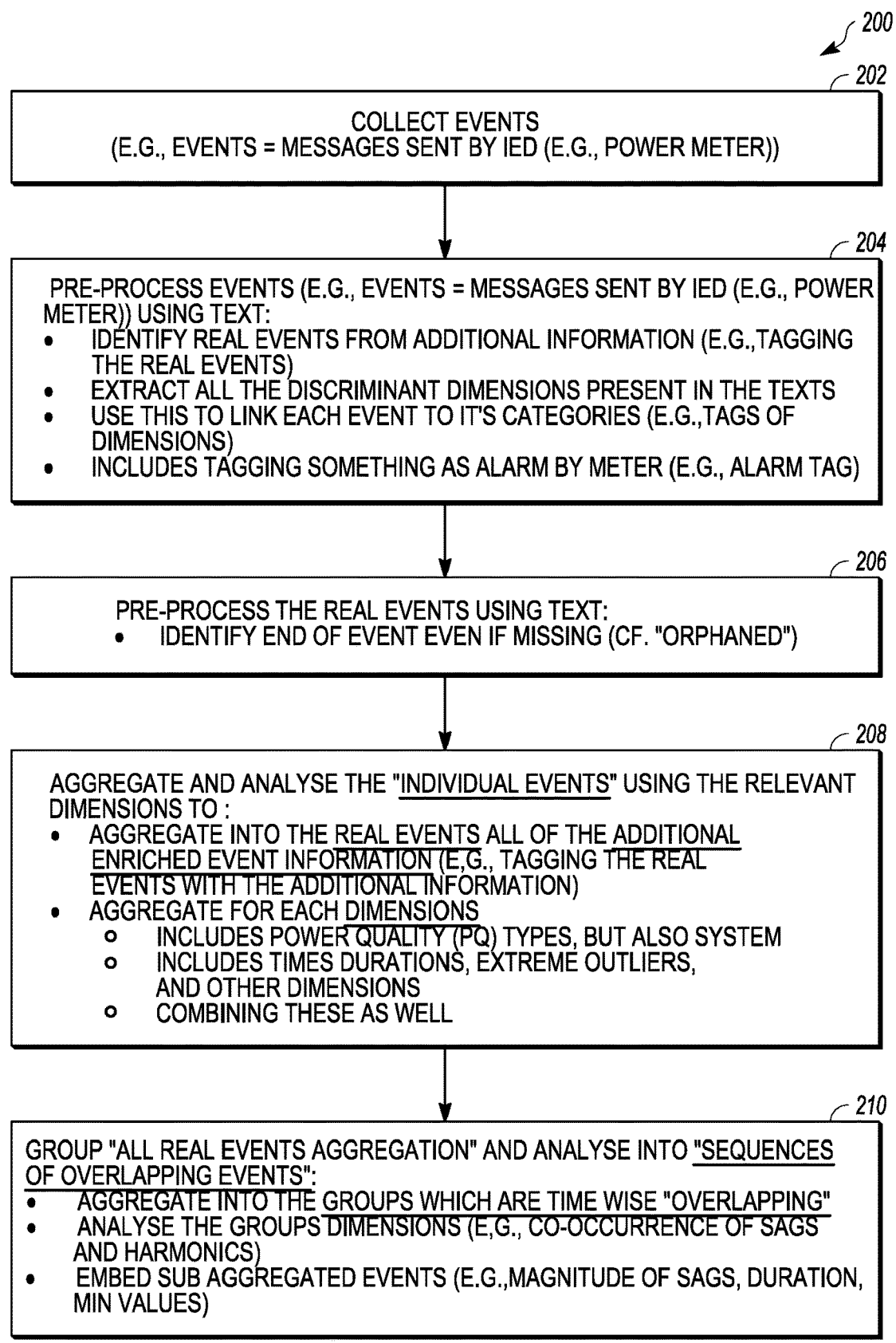
FIG. 2 illustrates a flow diagram of an example overall process by which events are pre-processed and aggregated in accordance with an exemplary embodiment of the present disclosure.

FIG. 2 illustrates a flow diagram of an example process 200 by which events are pre-processed to identify real events and aggregated in accordance with an exemplary embodiment of the present disclosure. By way of example, the process 200 may be performed by the components of a computer system (e.g., a processor(s) and other components described herein).

At reference 202, the processor collects events (and their event data) detected on a system. The events may for example be data collected and/or sent as messages by a power meter or other monitoring equipment for an electrical/power system or facility to other nodes or devices in a monitoring system.

At reference 204, the processor may perform pre-processing of textual data (e.g., text) from the event data of the events. For example, the processor may identify real events from additional information (e.g., by identifying a type of event being a "Voltage Sag" Power Quality type of event, even if the textual label was triggered by a "custom event/alarm" programmed in an IED which generated an event label such as "V1 sag event with magnitude of under 60"), and tag the real events accordingly (e.g., "Voltage Sag Phase 1 magnitude<60"). The processor may also extract discriminant parameters/dimensions present in the textual data, and use the extracted information to link each event to categories (e.g., tags of dimension). The processor may also tag a real event as an alarm (e.g., an Alarm tag) based on the event data (e.g., "Voltage Sag Phase 1 magnitude<60 alarm").

At reference 206, the processor may perform additional pre-processing of the real events using the textual data. For example, the processor may identify an end of event even if missing (e.g., an orphaned event), and perform any corrections as desired to facilitate event processing (e.g. rules, expertise, statistics, probability or machine learning or other AI algorithm based).

At reference 208, the processor may aggregate and analyze events according to at least one or more parameters/dimensions. For example, the processor may aggregate any identified additional information into the related real events (e.g., tagging real events with additional information, such as several magnitude evolutions captured at different time stamps during the event). The processor may also aggregate and analyse events for each dimension (e.g., by PQ types, system type, time durations, extreme outliers and other parameters/dimensions, and combine them as well).

At reference 210, the processor may aggregate real events into a group event (e.g., a sequence of overlapping events). For example, the processor may aggregate the real events into groups which are time-wise overlapping (see, e.g., FIGS. 8A through 8E), analyze the parameters/dimensions of the groups (e.g., any co-occurrence of sags and harmonics), and embed the groups with related sub-aggregated events (e.g., magnitude of sags, duration, min values, etc.). In this way, it is possible to identify anomalies and possible/probable causes for the anomalies, and take appropriate action, which may include generating an alarm or report or selectively controlling power, processes or equipment in a facility according to the analysis of the aggregated data.

In various embodiments, it is possible to use either the absolute time stamping such as with high precision time-stamping (e.g., a GPS system component or other network timesync system providing a sub-millisecond precision), or it is possible to use some more "fuzzy" timestamping algorithm or rule to create a "grobbing sequence of event" (e.g., a rule example would be adding 2 seconds to every event timestamp after it's terminus, or before it starts time stamp, or a calculation can be made (using unsupervised algorithm) of the probable time drift for a meter and then this specific "time extension" can be applied to each meter's time stamps), so as to make sure a sequence of overlapping events is encompassing all the related events, even if some devices clocks are somewhat off sync between each other. This can for example be applied in process 610.

Figure 3:
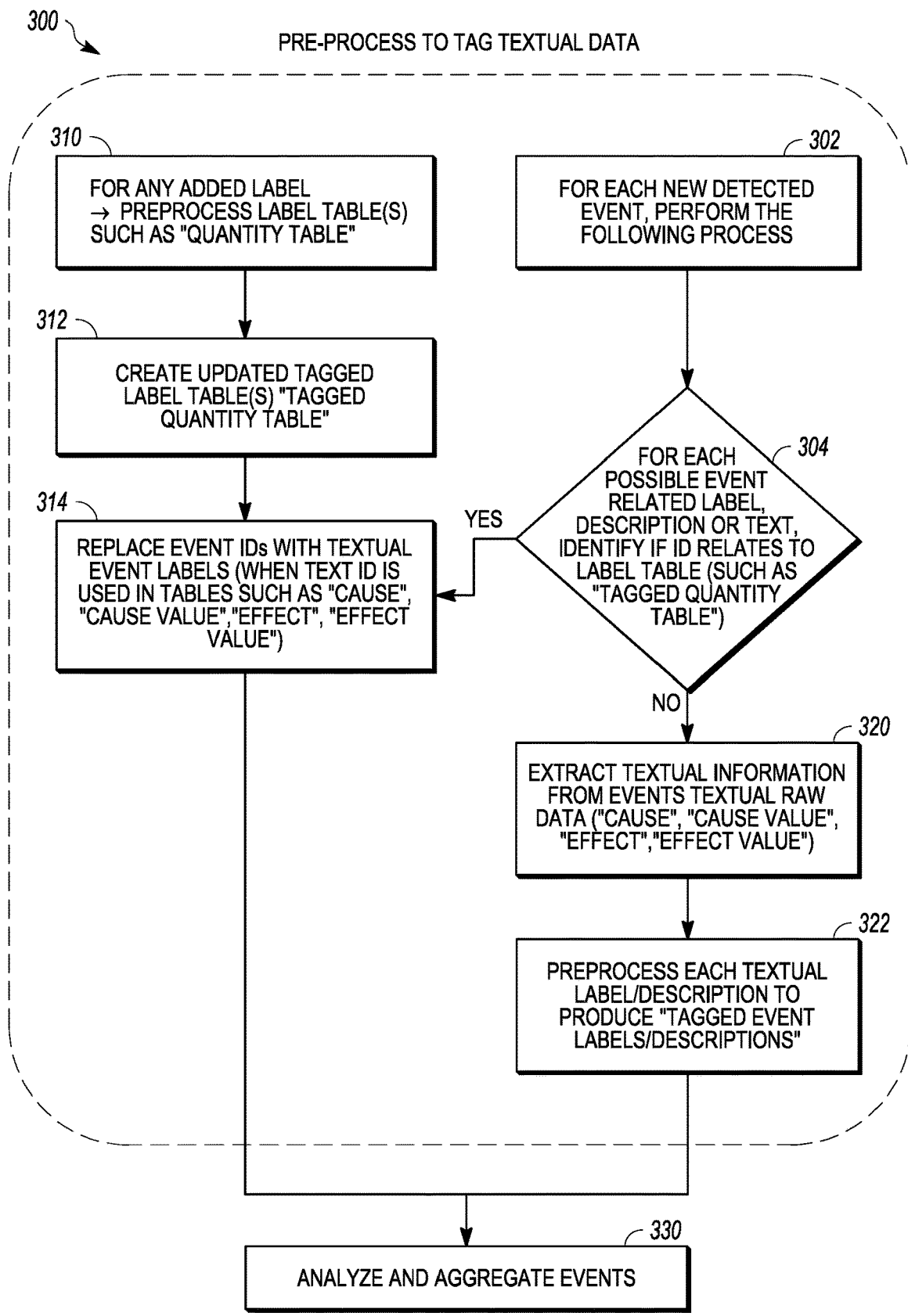
FIG. 3 illustrates a flow diagram of an example process by which pre-processing is performed to tag textual data of an event in accordance with an exemplary embodiment of the present disclosure.

FIG. 3 illustrates a flow diagram of an example process 300 by which pre-processing is performed to tag textual data of an event in accordance with an exemplary embodiment of the present disclosure. The process 300 is performed to convert event data to a common textual format for further processing while reducing or minimizing the loss of important information in the conversion. By way of example, the process 300 may be performed by the components of a computer system (e.g., a processor(s) and other components described herein). The process 300 is performed for each new detected event (e.g., message from a power meter or other monitoring equipment) such as noted in reference 302.

At reference 304, the processor identifies from event data if an identifier (ID) of a new detected event relates to a label from a label table (e.g., a Tagged Quantity table). As noted in references 310 and 312, the processor may perform pre-processing related to label table(s), such as pre-processing label table(s), e.g., "Quantity table" for any added label and creating updated Tagged Label table (e.g., "Tagged Quantity table"). The Quantity table may for example be a table concatenating all the labels, which corresponds to text descriptions of the events.

If the ID relates to a label table at reference 304, then the processor proceeds to reference 314 in which event IDs are replaced with textual event labels (when text ID is used in tables such as "Cause", "Cause value", "Effect", or "Effect value"). The process 300 then proceeds to reference 330 in which events are analyzed and aggregated.

Otherwise, if the ID does not relate to a label table at reference 304, then the processor proceeds to reference 320 in which textual information is extracted from textual raw data from the event data (e.g., "Cause", "Cause value", "Effect", or "Effect value"). At reference 322, the processor thereafter performs pre-processing of each textual label or description to produce Tagged Event Labels or description. The process 300 then proceeds to reference 330 in which events are analyzed and aggregated. It may also trigger later an update or revision of the quantity table such as in process 310.

Figure 4:
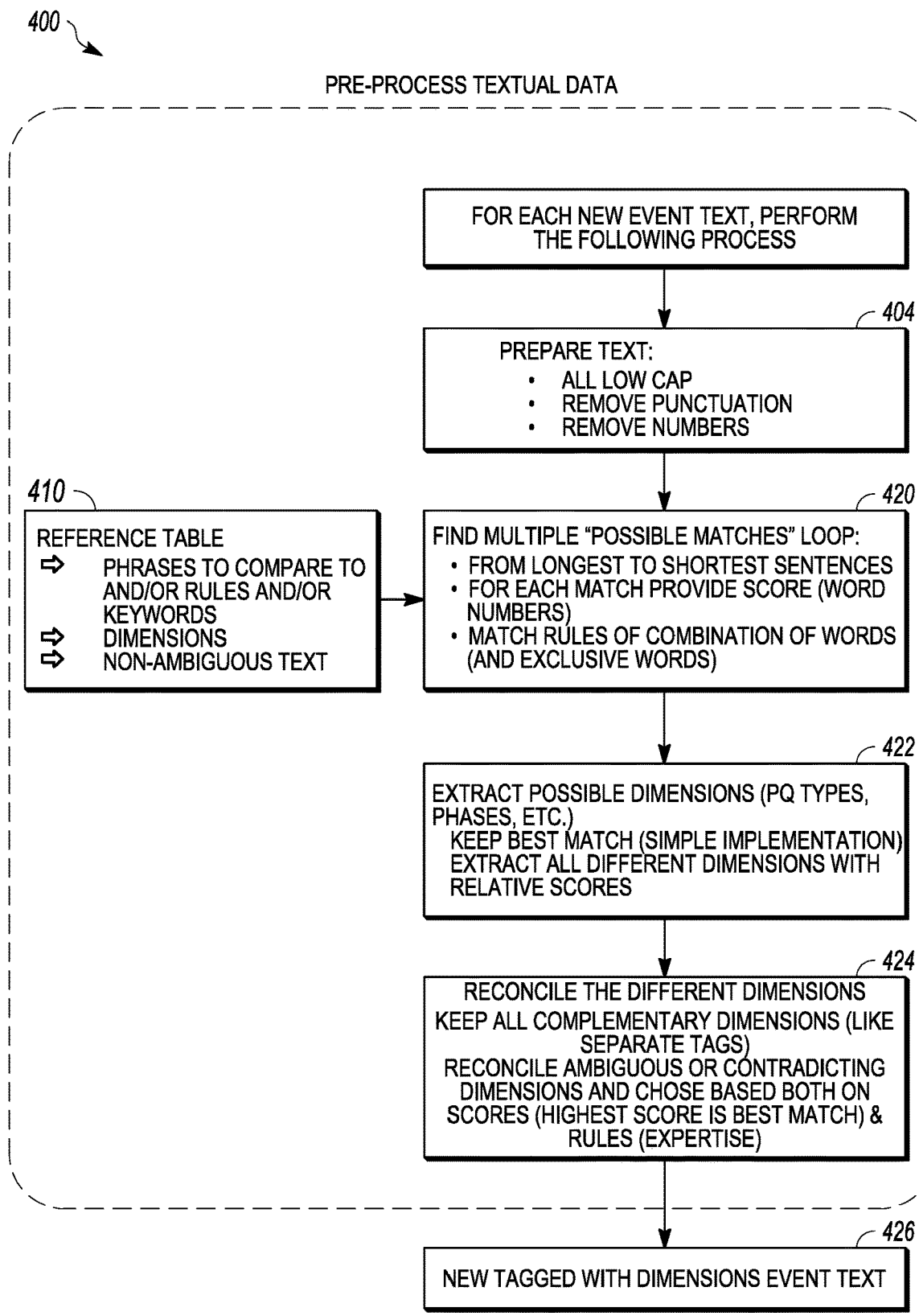
FIG. 4 illustrates a flow diagram of an example process by which pre-processing is applied on an event with tagged textual data in accordance with an exemplary embodiment of the present disclosure.

FIG. 4 illustrates a flow diagram of an example process 400 by which pre-processing is performed on an event with tagged textual data in accordance with an exemplary embodiment of the present disclosure. By way of example, the process 400 may be performed by the components of a computer system (e.g., a processor(s) and other components described herein). The process 400 is performed for each new event text, and by using a Reference Table such as noted at reference 410. The Reference Table may for example contain phrases to compare to rules and keywords, parameters/dimensions and non-ambiguous text.

The process 400 begins at reference 404 in which the processor prepares the textual data by changing them to low cap, removing punctuations and removing numbers (numbers may be extracted in other embodiments). At reference 420, the processor looks for possible matches of the textual data using the Reference Table. For example, the processor performs the matching from longest to shortest sentence, provides a score for each match (e.g., word number), and matches Roles of Combination of words (and exclusive words). The longer the sentence, the more precise the meaning becomes when the process processes the combination of all words and text (e.g., "VA sag alarm" is more meaningful than "sag alarm"). So the system looks first for the longest matching sentences or the highest number of words present in the label. And the number of words can even be used as a scoring element.

At reference 422, the processor extracts possible parameters/dimensions (e.g., PQ types, phases, etc.). In this operational example, the processor may keep the best match for a simple matching implementation, or may extract different parameters/dimensions with relative scores (and as explained in the previous point, the longest sentence or the highest number of different words often provides the best score because it also is the most precise when combining all the words/strings present). Other scoring methods may be used as well such as more semantic based rules, where the grammar of the sentence and the words may interact.

At reference 424, the processor may reconcile the different parameters/dimensions. For example, the processor may keep all complementary parameters/dimensions (e.g., like separate "voltage sag" and "phase A" tags combined into "Voltage Sag Phase A"), and may reconcile ambiguous or contradicting parameters/dimensions (e.g., "sag/swell" tag may be disambiguated by another "sag" tag) and chose based both on scores (e.g., highest score is best match) and rules (e.g., expertise).

At reference 426, the processor generates new event data for the detected events, with new tags for dimension event text. In this way, the event data for the detected events may be tagged with relevant dimension data in a searchable and analyzable format.

The above describes some example pre-processing operations, though these and other pre-processing operations may be performed to facilitate event/alarm aggregation and other data processing and analysis. For example, in accordance with various embodiments, real events may be distinguished from enriching events information. Real events may be considered as having a start time and an end time (e.g., waveform capture or WFC) or given one during pre-processing if missing. Real events may be aggregated with enriching events information. A re-classification may also be defined to distinguish and correctly select and combine the nature of each type of non-duration event (e.g., an instantaneous event).

Enriching events information may themselves be aggregated when they have sub-sequences (e.g., Time-Clock change Operations may aggregate both warning and status information). This may require all possible or recurring sequences analysis and/or an expertise of all tagging mechanisms inside the meters/devices to determine such possible sequences.

Missing "End-of-Event" event and time stamp may be double checked and validated by cross-correlating with regular values logging, and thus, may be corrected by the system at first occurrence of values above a threshold of event for this and each meter. Other events or group of events may as well be enriched and/or cross-validated by using other type of data (e.g., logged data and/or other system data, just as one example among others). Such an approach may require a specific accelerated logging of threshold values at the meter or at the system level (e.g., every one (1) second or every electrical cycle). A new event handling mechanism may also be implemented so that meters define all "related" or even "englobed in event" event tagging. For example, all relevant information may be associated with a single event-key.

A meter-system handshake mechanism may also be provided to make sure that no event is lost in communications (e.g., such as "end-of-event" event which may not have been acknowledged at the system level (in case of power interruptions during transmission for instance, at the gateway level)). Resending events may be tracked if not acknowledged by the system. This will enable a meter to send on restart/reboot a not correctly time stamped "end-of-event" event if the meter lost power and was not able to detect the correct "end-of-event" time stamp. The "long-lasting" or "indefinitely running" events or alarms may be analyzed and processed differently. Different processing may be applied to each sub-category/group and sub-group (e.g., 1. Filter them out from all the other alarms analysis and groupings; 2. Analyze each in distinct analysis and trend or detected abnormalities or alarms reports; and 3. Define specific models for each duration behaviour category, as for instance when defining and analyzing "overlapping events grouping").

Furthermore, keyword tagging may provide handles for all the other software functions to enrich the filtering functions, and define new categories and subcategories. A keyword list and functions may be updated and enriched via any relevant method (e.g., in the Cloud, from the Cloud to software or to devices, from Software to devices or the Cloud). This method may automatically recalculate the tags, and thus, update all the links, the different parameters/dimensions, the filters, and the aggregations. Key changes may be included in a report of the update. This approach may also provide actionable recommendations when new issues or solutions are identified as a result of new subgroups or aggregations.

Furthermore, N-grams and other text mining techniques may be used to build a table of correspondences and useful to tag any text. Co-occurrences of different words as well as mutually exclusive words may be found to disambiguate the text. Unique sentences may be found where the meaning is non-ambiguous.

B. Process Event

Figure 5:
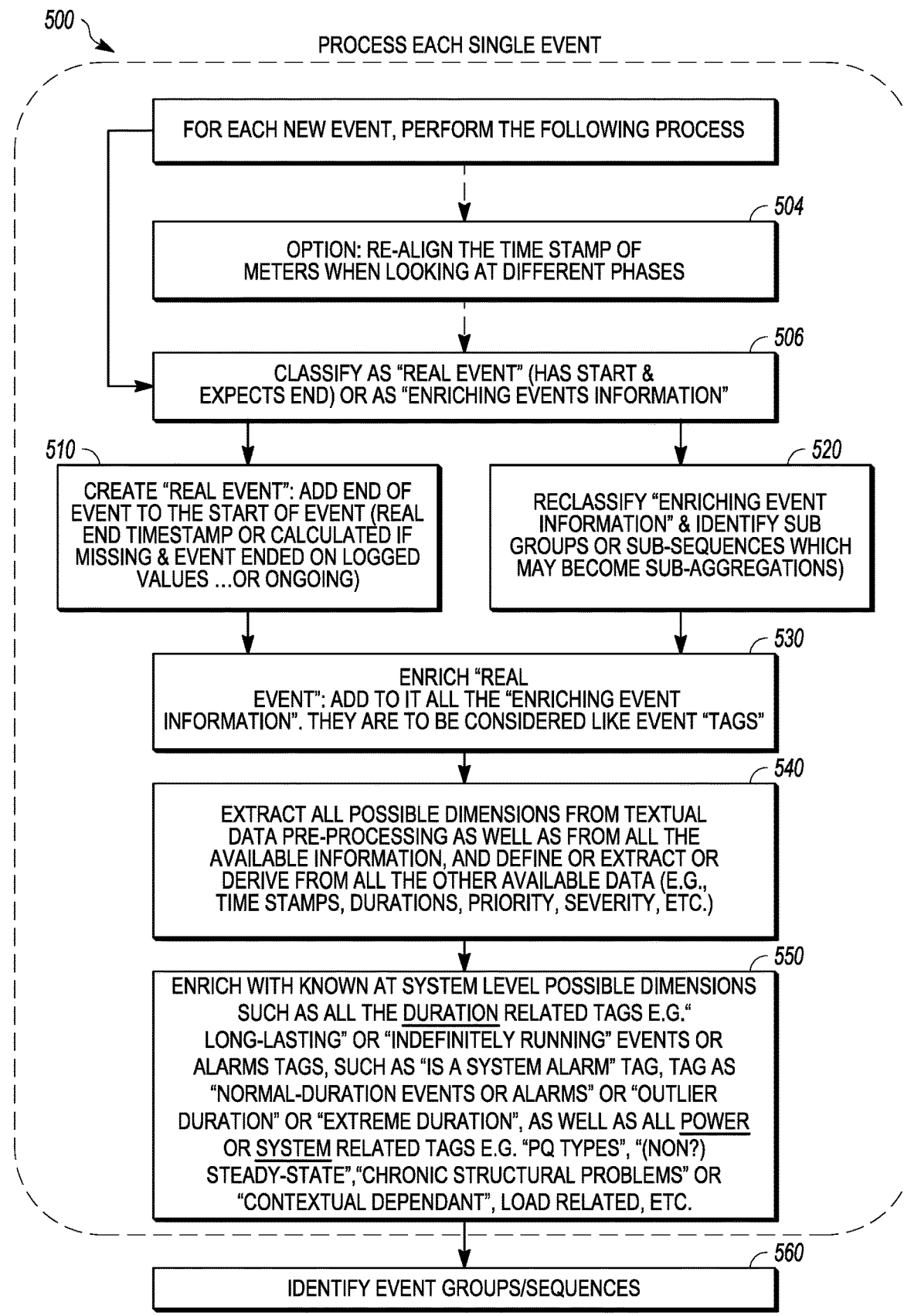
FIG. 5 illustrates a flow diagram of an example process by which each new event is processed in accordance with an exemplary embodiment of the present disclosure.

FIG. 5 illustrates a flow diagram of an example process 500 by which each new event is processed in accordance with an exemplary embodiment of the present disclosure. By way of example, the process 500 may be performed by the components of a computer system (e.g., a processor(s) and other components described herein). The process 500 is performed for each new detected event (e.g., message from a power meter or other monitoring equipment). Each new event may have its associated time stamp re-aligned when looking at different phases (see, e.g., reference 504)

The process 500 may begin at reference 506, in which the processor may classify an event and its data (e.g., a message from a power meter or other monitoring equipment) as a "real event" when it has a start and end time or as an enriching event information. Even if end time stamp is missing, an event may be classified as a "real event" based on rules (e.g., an event which matches one of the power quality type of alarms such as for example a "voltage sag", "voltage unbalance", "transient", "voltage interruption", "outage", etc.).

At reference 510, the processor may create a real event based on the event data, such as by adding an end of event to a start of the event (e.g., real end time stamp, or calculated if missing and the event ended on logged values or is still ongoing). At reference 520, the process may also reclassify any enriching event information, and identify sub-groups or sub-sequences which may become sub-aggregations (e.g., "phase information", tracking the evolution as sag first is linked to phase information "line to line", then in the middle of the sag duration the IED sends "line to neutral/ground" event enriching information).

At reference 530, the processor may enrich the real event, such as by adding the enriching event information to the real event. The information may be treated like event tags, which are added to the real event or its event data.

At reference 540, the processor may extract possible parameters/dimensions from textual data pre-processing as well as from all of the available information, and may define or extract or derive from all the other available data (e.g., time stamps, durations, priority, severity, etc.).

At reference 550, the processor may enrich with known at system level possible parameters/dimensions, such as the DURATION related tags e.g. "long-lasting" or "indefinitely running" events or alarms tags (such as "is a system alarm" tag, tag as "normal-duration events or alarms" or "outlier duration" or "extreme duration"), as well as POWER or SYSTEM related tags e.g. "PQ Types", "(non?) steady-state", "chronic structural problems" or "contextual dependant", load related, etc. In various embodiments, some additional rules or analysis may be implemented as part of the process such as identifying outlier detection using simple statistical calculation such as median duration+1.5*IQR (referring to the "Inter-Quantile ratio" between the $25^{th}$ percentile and the $75^{th}$ percentile, which will not be further explained in detail herein as this is a standard statistical rule), or using more advanced Artificial Intelligence/Machine Learning algorithms (Isolation Forest, DBSCAN, etc.).

The process 500 thereafter proceeds to reference 560 to identify event groups/sequences.

Figure 6:
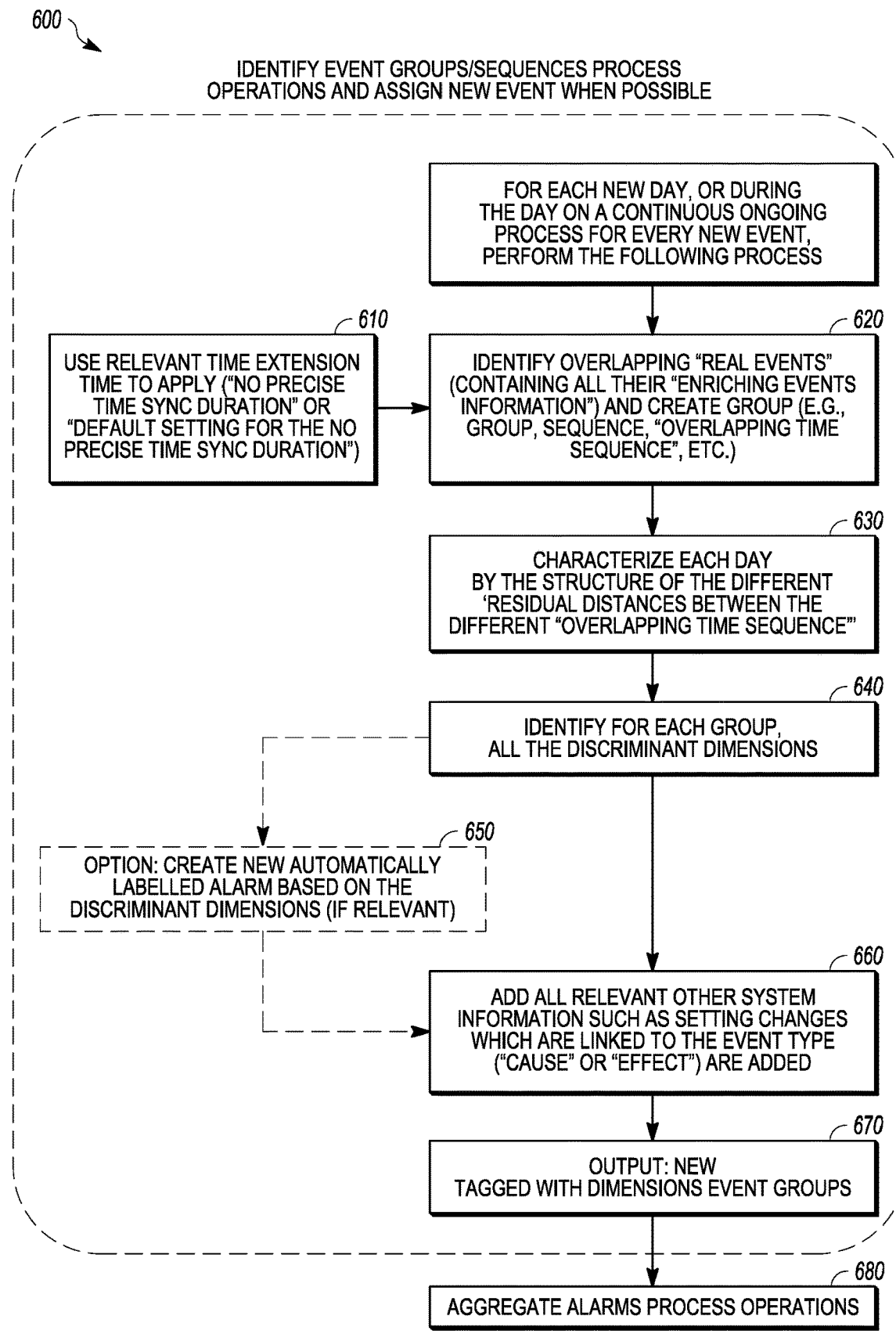
FIG. 6 illustrates a flow diagram of an example process by which real events and their Enriching Events Information as well as other system information are aggregated into event group(s) in accordance with an exemplary embodiment of the present disclosure.

FIG. 6 illustrates a flow diagram of an example process 600 by which the real events are grouped into event group(s) in accordance with an exemplary embodiment of the present disclosure. By way of example, the process 600 may be performed by the components of a computer system (e.g., a processor(s) and other components described herein). The process 600 may be performed for each new day, across multiple days, or during the day (in real-time) on a continuous ongoing process for every new event or over a desired predefined time period. The relevant time extension time may be used to apply either "no precise time sync duration" or "default setting for the no precise time sync duration" (see, e.g., reference 610, and a description of the problem and some possible solutions in process 210).

The process 600 may begin at reference 620 in which the processor identifies overlapping real events, and creates a group with an overlapping time sequence. At reference 630, the processor may characterize each data by the structure of the different residual distances between the different overlapping time sequences (e.g., an input to any AI/Machine learning algorithm analysis for reference 610). At reference 640, the processor may identify all of the discriminant parameters/dimensions for each group. At reference 650, the processor may create new automatically labelled alarm based on the discriminant dimension(s) (if relevant or desired). At reference 660, the processor may add other relevant system information, such as adding setting changes which are linked to the event type (e.g., "cause" or "effect" will be impacted if the alarm related thresholds are changed). At reference 670, the processor outputs event group(s) which are newly tagged with parameters/dimensions.

Figure 7:
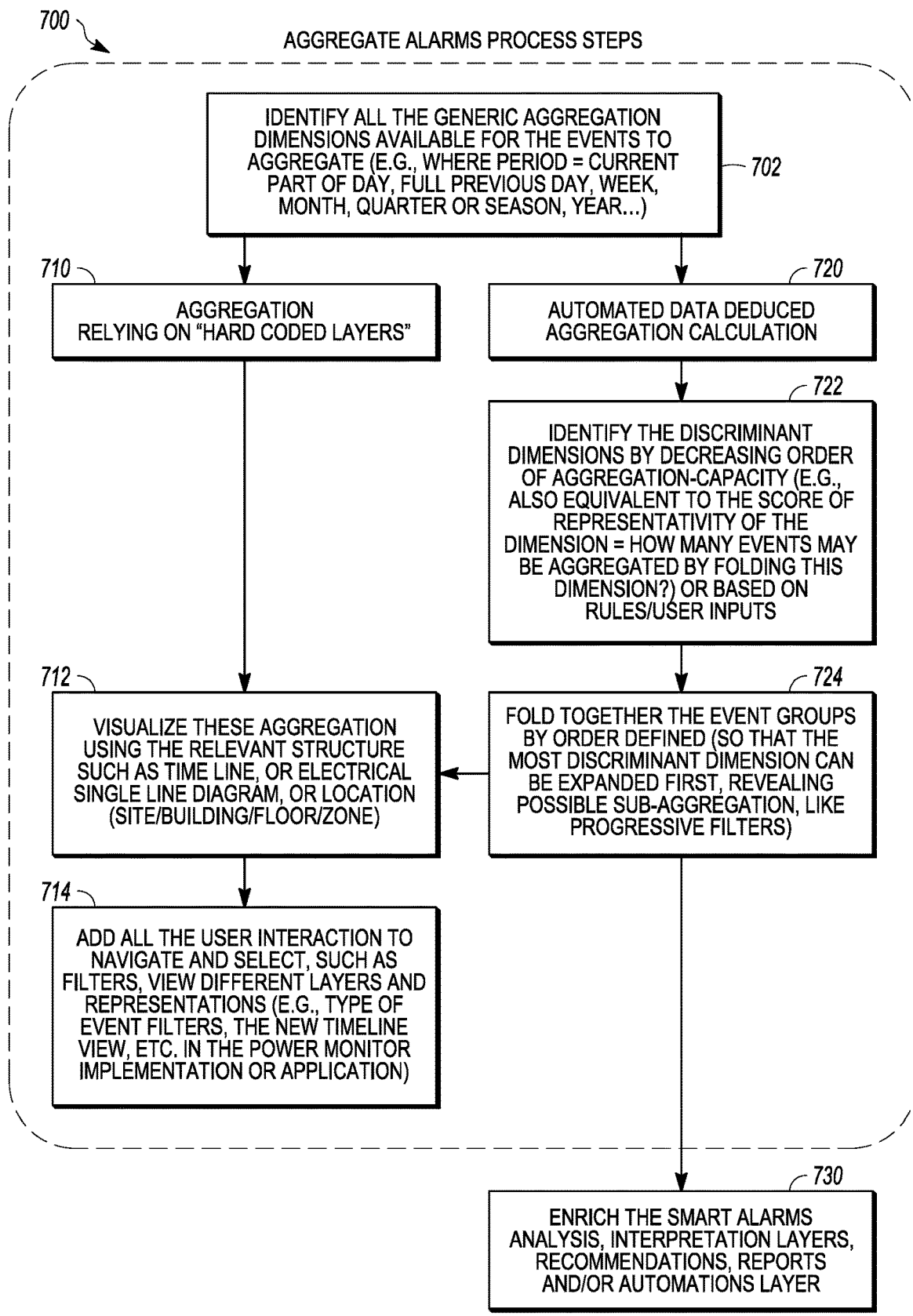
FIG. 7 illustrates a flow diagram of an example process of aggregating alarms in accordance with an exemplary embodiment of the present disclosure.

The process 600 may thereafter proceed to reference 680 to perform the operations for an aggregate alarms process (see, e.g., FIG. 7).

FIG. 7 illustrates a flow diagram of an example process 700 of aggregating alarms in accordance with an exemplary embodiment of the present disclosure. By way of example, the process 700 may be performed by the components of a computer system (e.g., a processor(s) and other components described herein).

At reference 702, the processor may identify all the generic aggregation parameters/dimensions available for the events to aggregate (e.g., where period=current part of day, full previous day, week, month, quarter or season, year, etc.).

At reference 710, the processor may perform aggregation relying on hard-coded layers. For example, aggregation may be performed according to predefined expert derived rules and settings. At reference 712, the processor may visualize the aggregation using the relevant structure, such as a time line, or electrical single line diagram, or location (e.g., site, building, floor, zone, etc.). At reference 714, the processor may add all of the user interaction to navigate and select, such as filters, view different layers and representations (e.g., type of event filters, the new timeline view, etc.) in a power monitoring implementation or software/program, and other selections.

Turning back to reference 702, the processor 700 may instead proceed to reference 720 in which the processor may perform automated data deduced aggregation calculation. At reference 722, the processor may identify the discriminant parameters/dimensions by decreasing order of aggregation-capacity (e.g., also equivalent to the score of representativity of the dimension=how many events may be aggregated by folding this dimension?) or based on rules/user inputs. At reference 724, the processor may fold together the event groups by the order defined (e.g., so that the most discriminant dimension may be expanded first, revealing possible sub-aggregation, and so forth similar to progressive filters). From reference 724, the process 700 may proceed to references 712 and 714 (as described above) or to reference 730 in order to enrich or enhance alarm analysis, interpretation layers, recommendations, reports and/or automation layers. This includes taking actions based on such aggregations and the associated discriminant information (e.g., creating a report, starting or postponing a building or manufacturing related process, etc.).

The above described some example operations of event/alarm processing. However, these and other event/alarm processing operations may be performed to facilitate the event/alarm aggregation operations described herein. For example, in accordance with various embodiments, the duration cut-off value may be automatically determined to discriminate between "normal-duration events or alarms" from other "event duration categories", which may be again subdivided. Outlier durations may be processed as a separate category of "normal events" and "extreme outliers", which may also be sub-divided into additional categories. A new key indicator of loss of signal in the system may be provided (e.g., to step back at the system level and identify new reports/diagnostics and recommendations (indicative of health status degradation of system)).

Categories of time discrimination (e.g., 0s, 1s, 1 hr, 1 day, etc.) may be different for each type of event, which may enable aggregations linked to similar durations. These may be applied to Non-Steady state alarms as well. In this way, chronic structural problems (constant high values) may be distinguished from contextual issues (such as harmonics linked to specific combinations of loads starting or running at same time).

Any known hierarchy may be used to aggregate alarms. For example, an Electrical Single Line Diagram is a hierarchy which may be used to aggregate alarms on a branch-by-branch basis (e.g., apply a "filter at each node" aggregation, or deselect a filter at each upstream node to "widen" the number of meters considered). Furthermore, a location-based aggregation may be assimilated to a hierarchy (e.g., Client-Sites-Building-Floor-Zone). Usage of loads (e.g., lighting, HVAC, specific industrial or building process steps) may also be taken so different groupings of functions or usage groups may be used to aggregate alarms related to each other. Furthermore, separate aggregation may be performed according to the nature of events (e.g., Power Quality type, Protection type such as pre-trip warning (level 1 threshold), pre-trip alert (level 2 threshold) and thermal trip alarm, Operations type, or all the monitoring and analysis systems events/alarms).

Each event, which overlaps with another event, may be aggregated into one "overlapping time sequence" or group. Each "overlapping time sequence" may be extended by "no precise time sync duration". By extending the application of the method of "no precise time sync duration", it is possible to create a time aggregation mechanism for all the "overlapping time sequence", which may be extended by an additional duration added to the sequence.

For example, all distances between "overlapping time sequence" may then be calculated and ranked in increasing order (e.g., augmenting distance between the "overlapping time sequences"). A simple time aggregation may be performed by taking the next distance value for grobbing. By applying this approach to each day or any relevant time period, an automatic time aggregation mechanism may be created.

It is also possible to define a default setting for the no precise time sync duration value, applicable for all days, as a standard value to compensate for possible time sync glitches. Such a value may be calculated or defined using many different processes (e.g., statistical calculations, rules or expertise-based defined, or any in between form such as a moving self-adapting value per day or any other relevant time period) as described in 210 and 610.

A key indicator to use may be the residual distance/duration between different "overlapping time sequence". Each day or desired time period may be analyzed and characterized by a structure of different residual distances/durations (time between different "overlapping time sequence"). For example, different times of day (e.g., day, night, morning, afternoon, 2:00 am to 5:00 am, Monday, December, etc.) may have significantly more or less events/alarms, a constant level of events/alarms, smaller or larger clusters of events/alarms and so forth; therefore, the residual distances may be tailored accordingly to these profiles. This feature may then be combined with other discriminant parameters/dimensions to enable more focused recommendations and to trigger additional higher level actions, alerts or alarms. For example, a day with increasing sizes of "overlapping time sequence" appearing in a "random fashion when analyzing time stamps" may then trigger a specific alarm. The previous alarm may automatically be labelled a "constantly growing sequences alarm". As such, such a new alarm may be automatically labelled based on the discriminant parameters/dimensions. Furthermore, the recommendations may be enriched by adding these discriminant parameters/dimensions inside the text.

In accordance with further embodiments, by analyzing the trends of slow increases of distances between one typical meter and other probable related (or adjacent) "overlapping time sequences", possible constant "time drifts" may be detected such as lagging or leading for a meter or group of meters. Furthermore, by analyzing the "jumping movements" of a specific meter around the centre (e.g., median or mean) of the probably related "overlapping time sequences", possible "time inconsistencies" may be detected for a meter or a group of meters.

An aggregation may also be created based on textual analysis for other devices such as (old) legacy devices, but even more for the "free text format" such as for "Custom events" (e.g., such as custom alarms programmed inside the software or the meters at the commissioning time, or even later, enriched over time, by expert users). Meters types or power equipment may be selected or filtered to provide a common grouping as well.

The phases may also be grouped into a single event group (e.g., aggregate all the different events of one meter) labelled such as "phases". The single event or groups may be enriched with metadata tags (e.g., hierarchy data and sites/building) which may then be used as possible aggregators. An event may be characterized by extracting all significant elements from the Event information, and may add these as tags or data points swallowed up (e.g., aggregate them). Furthermore, the time stamp of meters may be re-aligned when looking at different phases. In this way, a newly calculated common time stamp may be calculated for these events and for each sub-sequence element/step within the system, without having to remove the existing time stamps provided by the meters (e.g., reference 504.

The "cause" and the "effects" of an event may be regrouped (e.g., initial "cause"=what triggered the event, such as a voltage measurement dropping below a threshold, "effect"=triggering a waveform capture or an alarm). The initial cause also may not be the best key representative value so the best representative values instead may be selected. Any relevant other system information may be added such as setting changes, which are linked to the event type ("cause" or "effect"). These may include for example changes of status.

The time duration also may be adapted to the PQ type of event (e.g., different for a "transient" and for a "sag"). The input/output information may be made explicit by providing textual descriptions from the metadata associated in meters or in system, and operation time stamps may also be added (e.g., add "Motor start" time stamps) for association with the same sequence.

Co-occurrence of different type of PQ events inside the same "overlapping events sequence" may be used to provide an overview of possible links.

III. Alarm Event Analysis Example

In accordance with a further embodiment, the event grouping processes described herein may be performed for Alarms (also referred to as Alarm events), which are events that have been tagged or identified as an alarm according to a set of criterion, such as classification and presentation rules. The Alarms may be grouped into event groups, such as Incidents, according to a second set of criterion. Many other groupings may be performed. Yet in the case of the Power Monitoring Expert software, the term "Incidents" may refer to one such grouping of real events, including some of the enriching event information (e.g., the DDD related information per real event or the status of an I/O on the IED related to a motor start, etc.).

In this way, a monitoring system can, among other things, provide the following: a high resolution, high accuracy event sequence record to find origins of fault; cross system event correlation to help reconstruct sequence of overlapping events; speed the diagnosis of power incidents by automatically creating a visual timeline of the incident showing related events, waveforms and trends; the ability to gain deeper insight about the source (is the measurement point closest to the source of the problem, is also sometimes called "cause") and impact of an incident by seeing a visual timeline before, during, and after the incident; and the ability to record an analysis for later viewing, with custom annotations and custom filters to show for example what is most relevant; and support for thermal monitoring (e.g., early detection of thermal run away, optimizes operations with condition based maintenance, alarming and historical analysis for detection of slow deterioration, and plot against and correlate to other electrical parameters (e.g., harmonics).

An example of a dimension which may be used to create or distinguish groups of events is the Disturbance Direction Detection (DDD). The DDD is an additional information calculated by the meter to indicate if the event originated more probably upstream or downstream of the Real Event (such as a sag). It also comes with a confidence value indicating how confident the meter is in the determined direction (pointing source to upstream or downstream). DDD events will thus be associated with a Real Event. Then the DDD may be used to separate groups by pointing upstream or downstream, based on high and medium confidence values only. This may then be used in an electrical single line diagram representation to help the user find the most probable source of a sag, using arrows to graphically show the direction of the probable source.

Figure 8A:
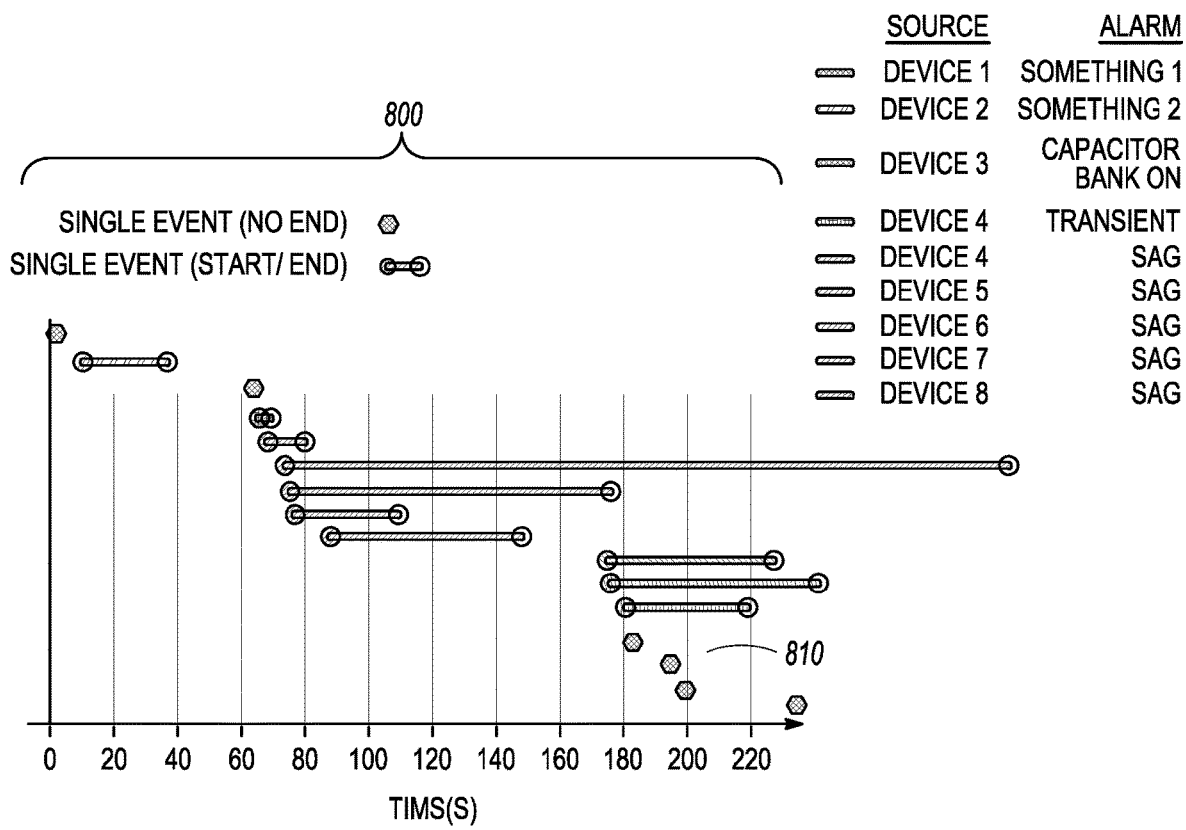
FIGS. 8AA, 8AB, 8AC, 8AD, 8AE, 8AF, 8AG, 8AH, 8AI, 8AJ, 8AK, 8AL, 8AM, 8AN, 8AO, 8AP, 8AQ, 8B, 8C, 8D and 8E are graphs illustrating aggregation examples of real events (e.g., Alarm events) over time in accordance with an exemplary embodiment of the present disclosure.
Figure 8A:
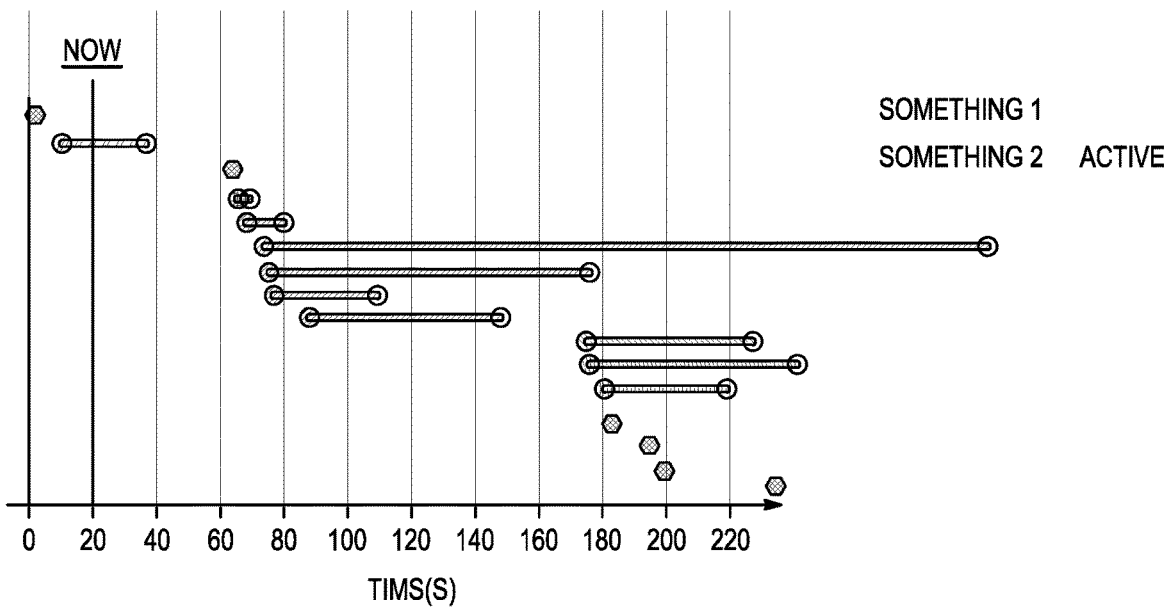
Figure 8A:
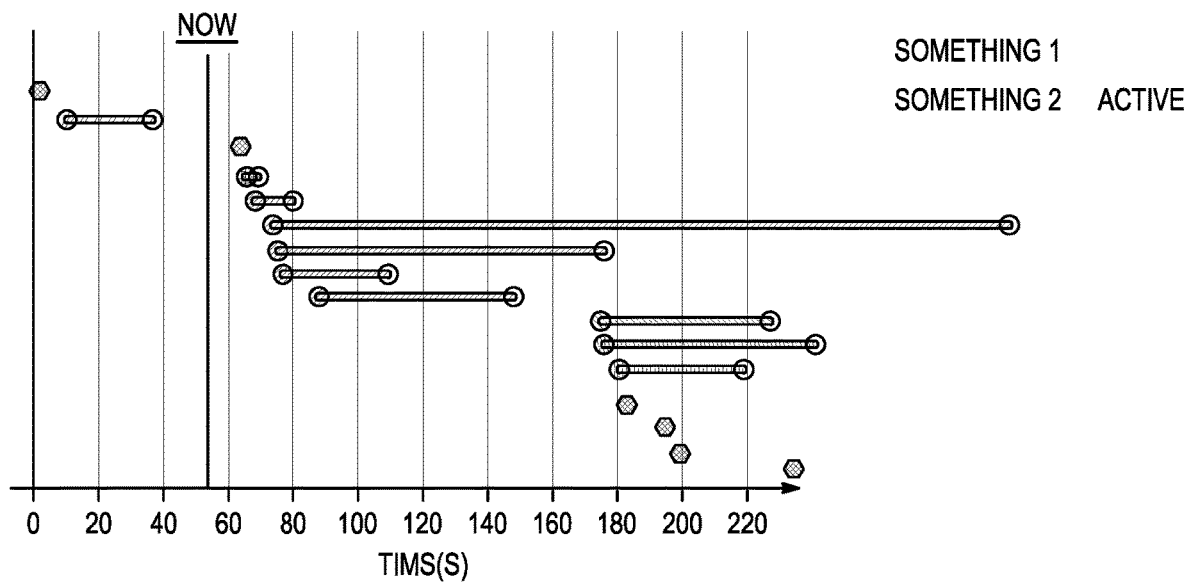
Figure 8A:
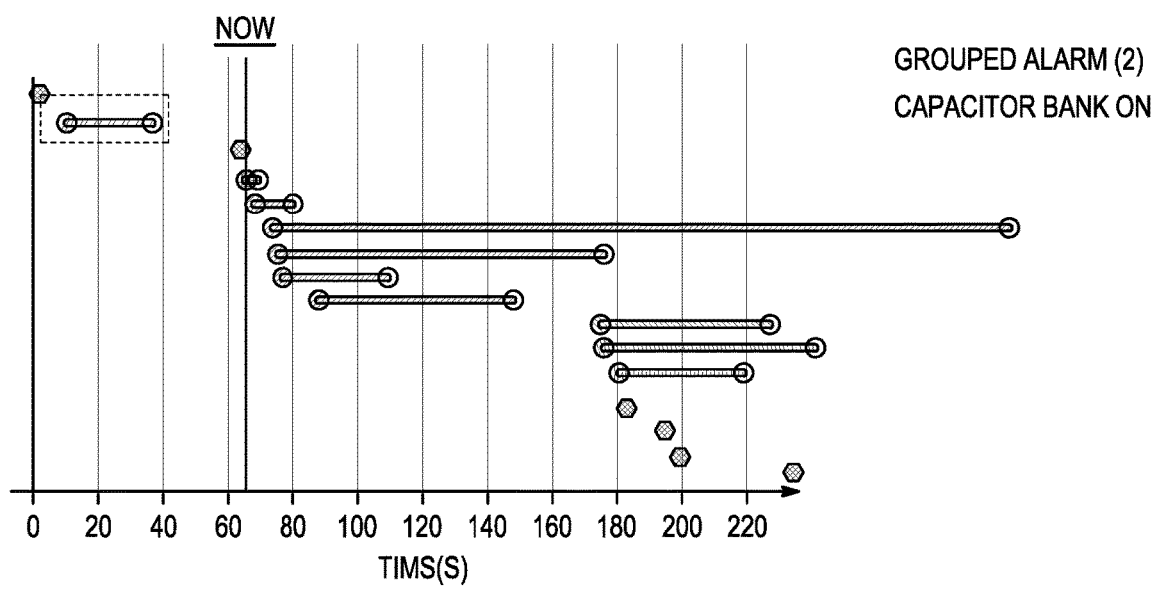
Figure 8A:
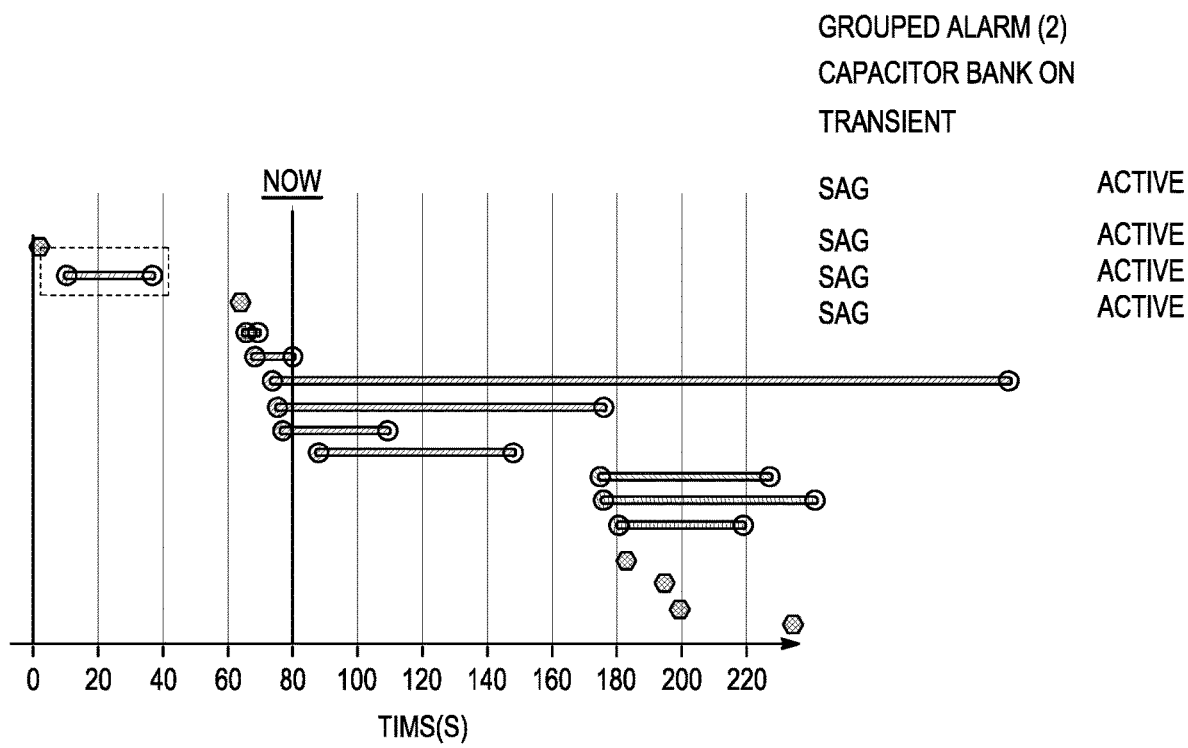
Figure 8A:
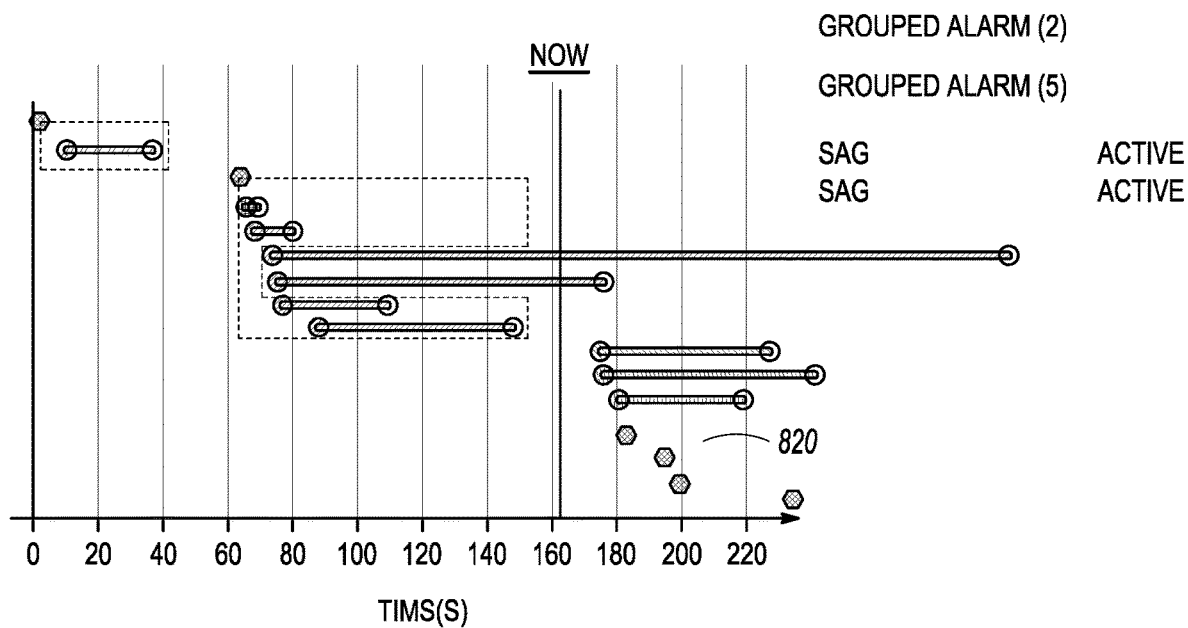
Figure 8A:
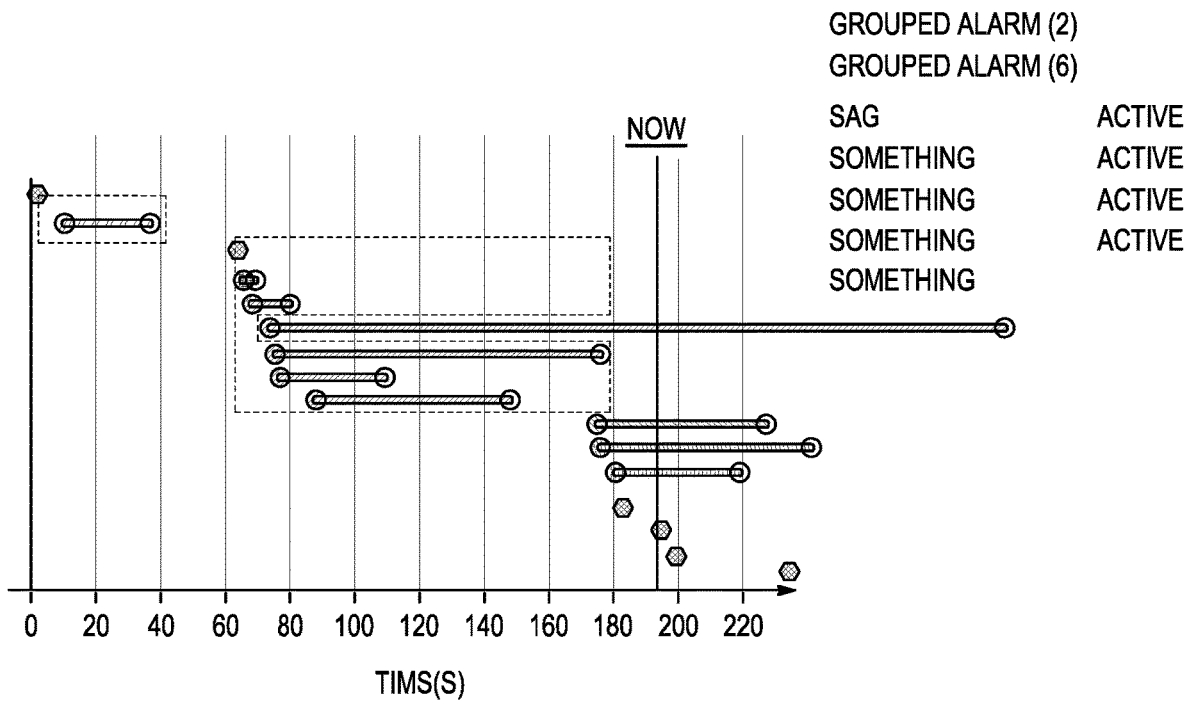
Figure 8A:
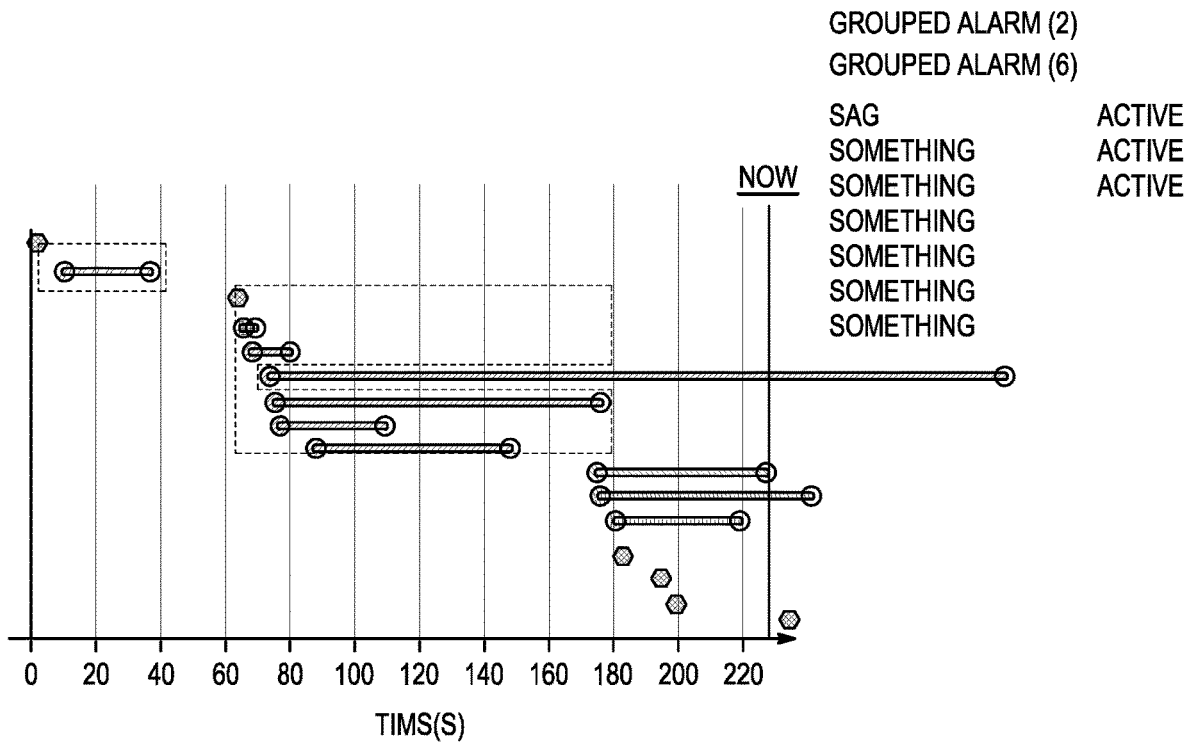
Figure 8A:
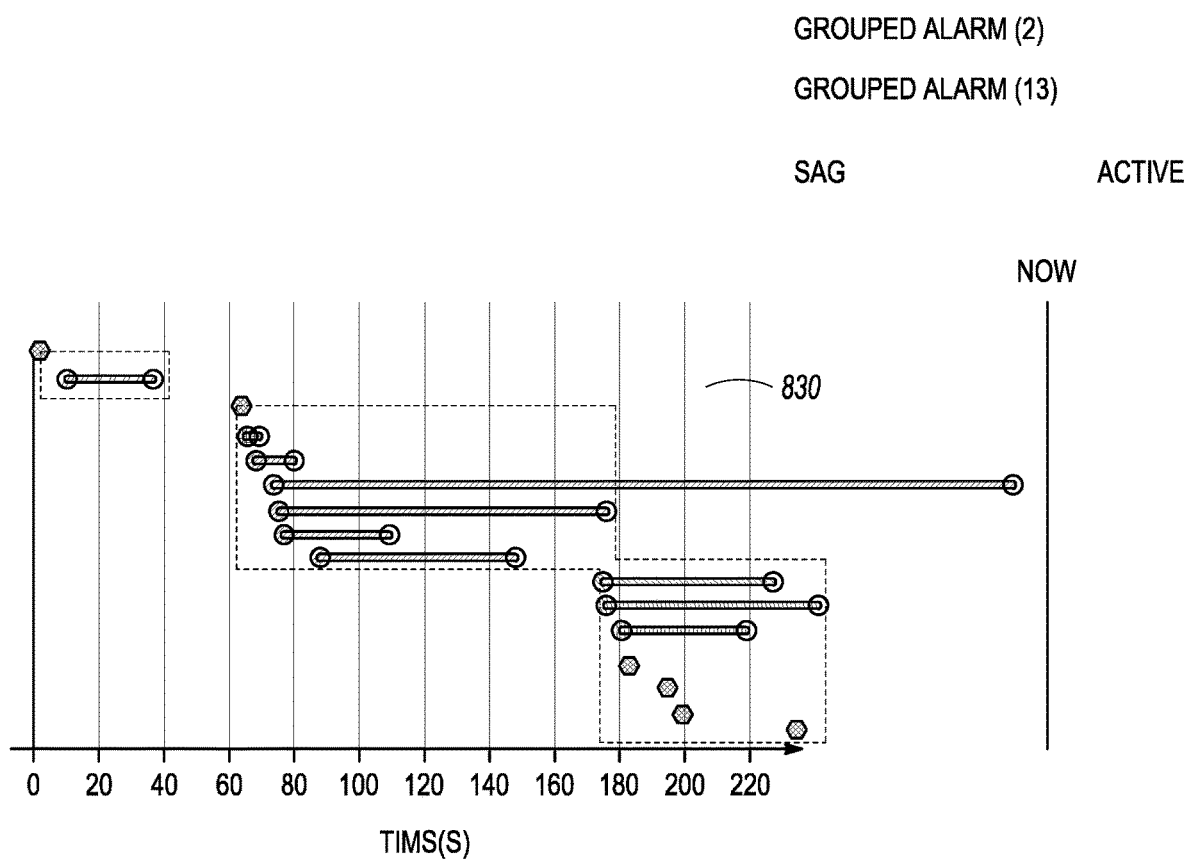
Figure 8A:
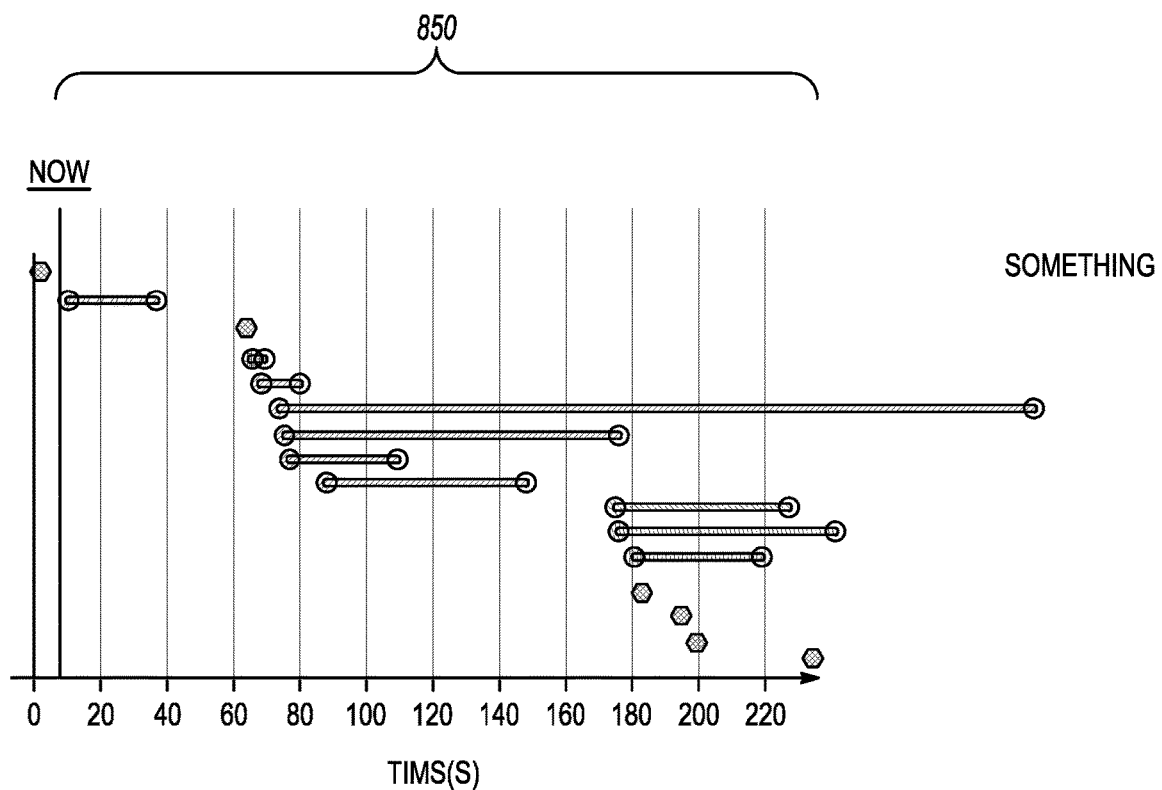
Figure 8A:
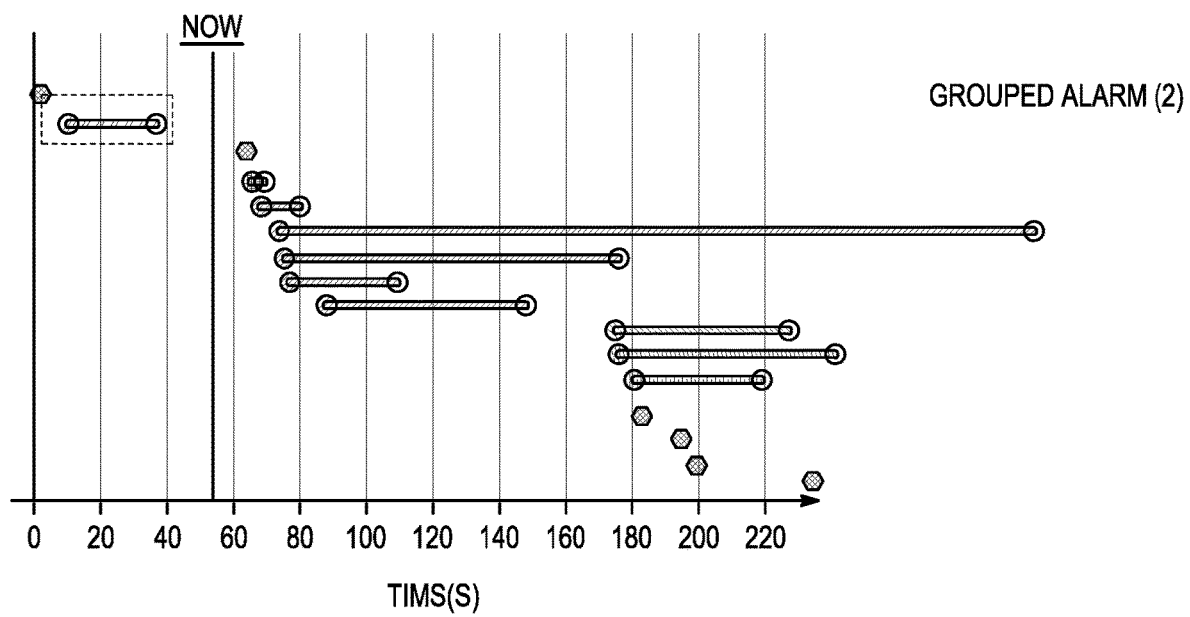
Figure 8A:
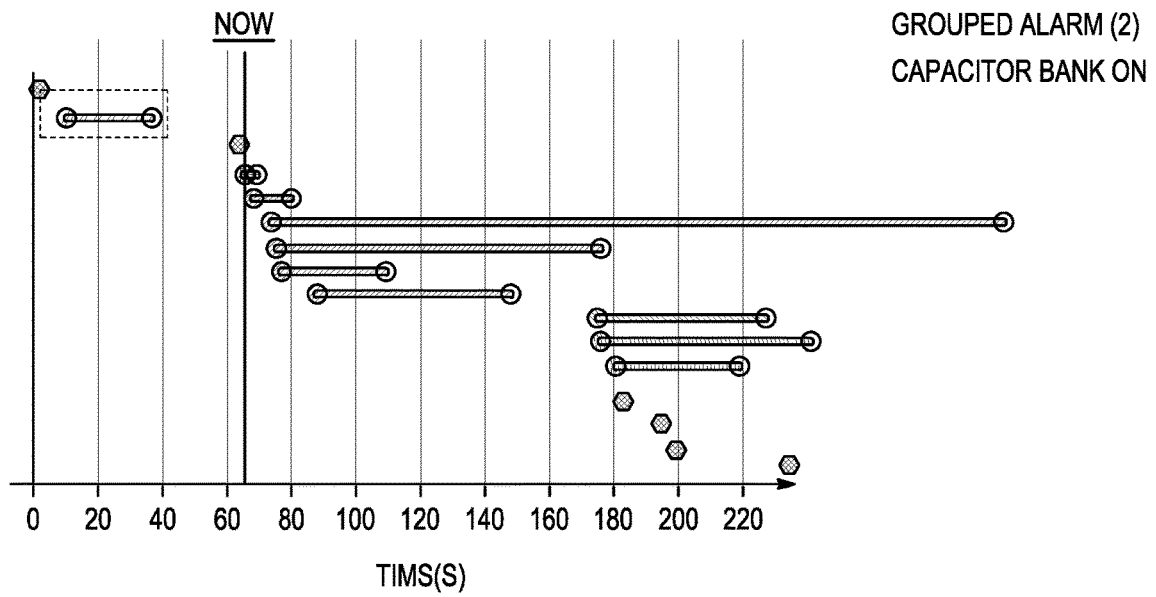
Figure 8A:
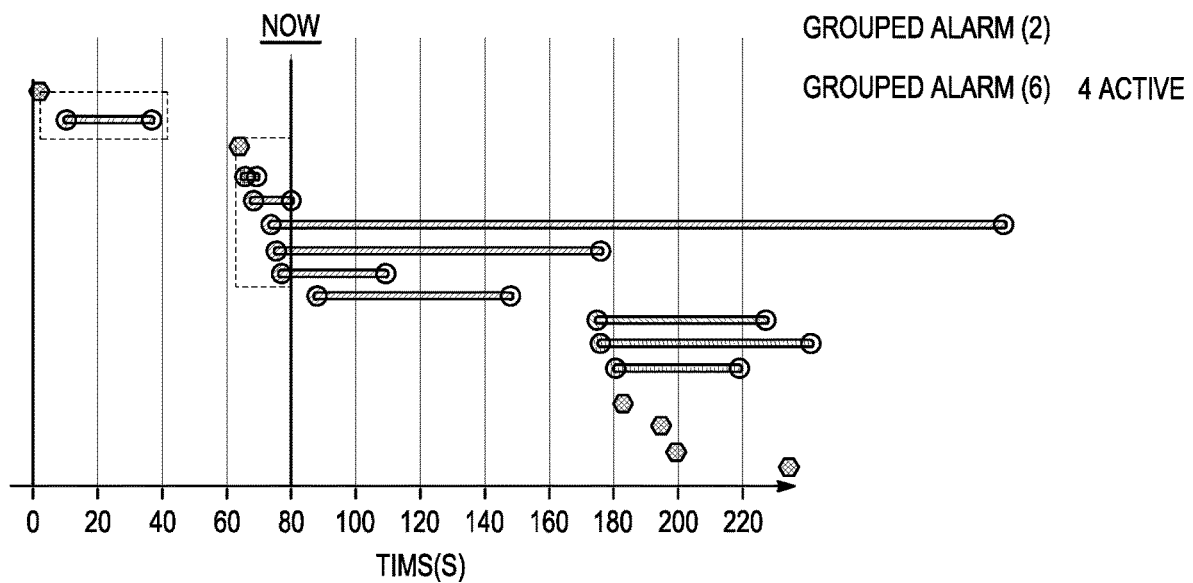
Figure 8A:
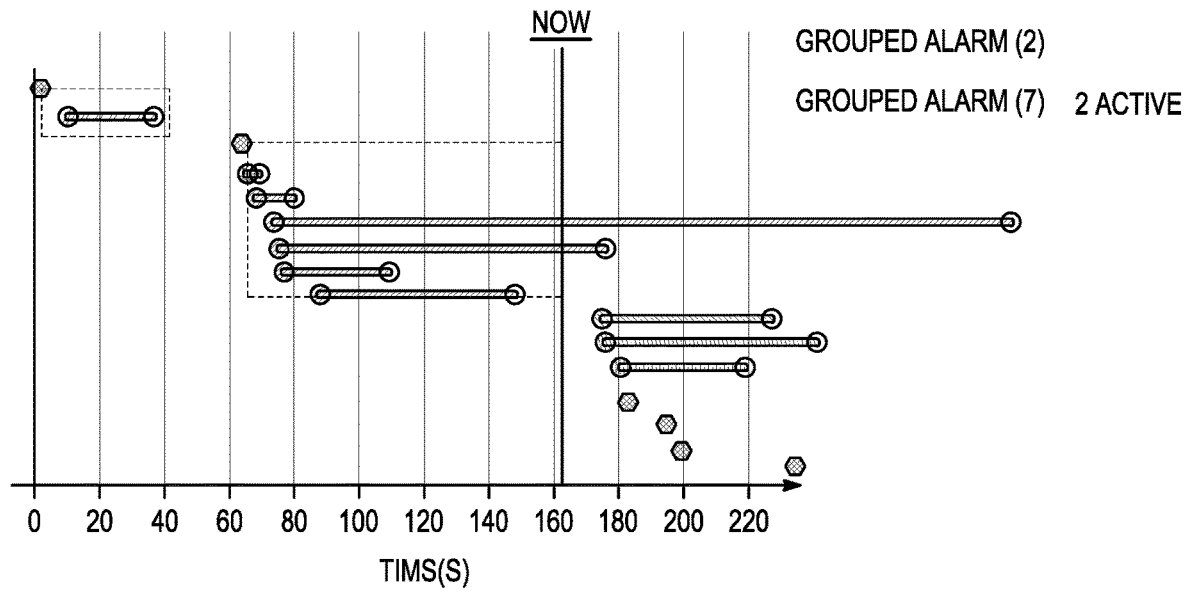
Figure 8A:
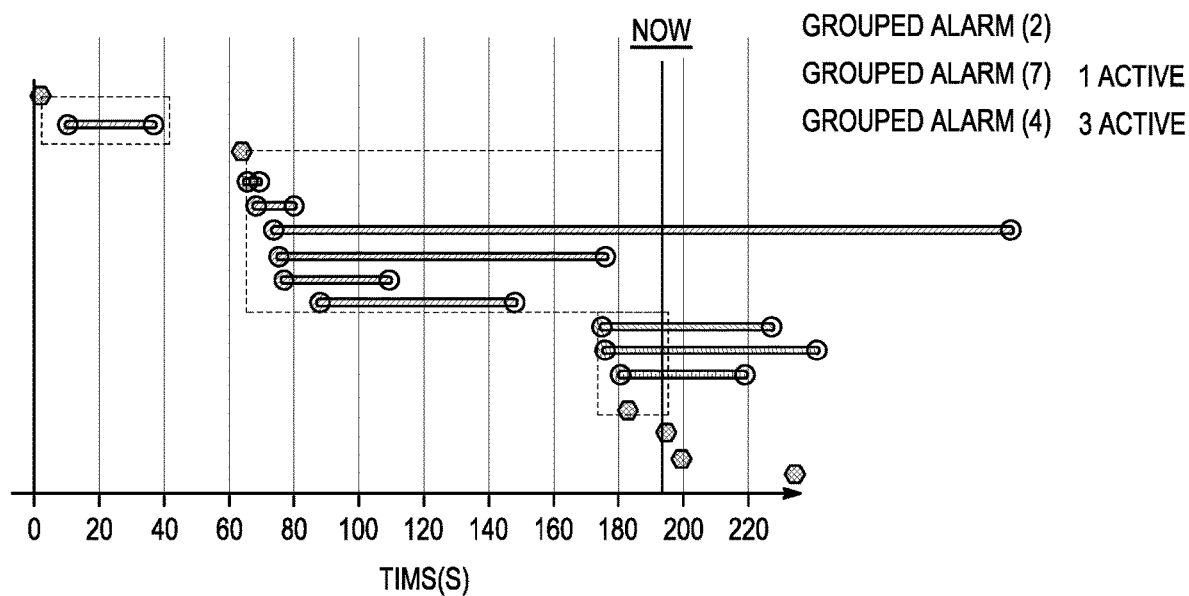
Figure 8A:
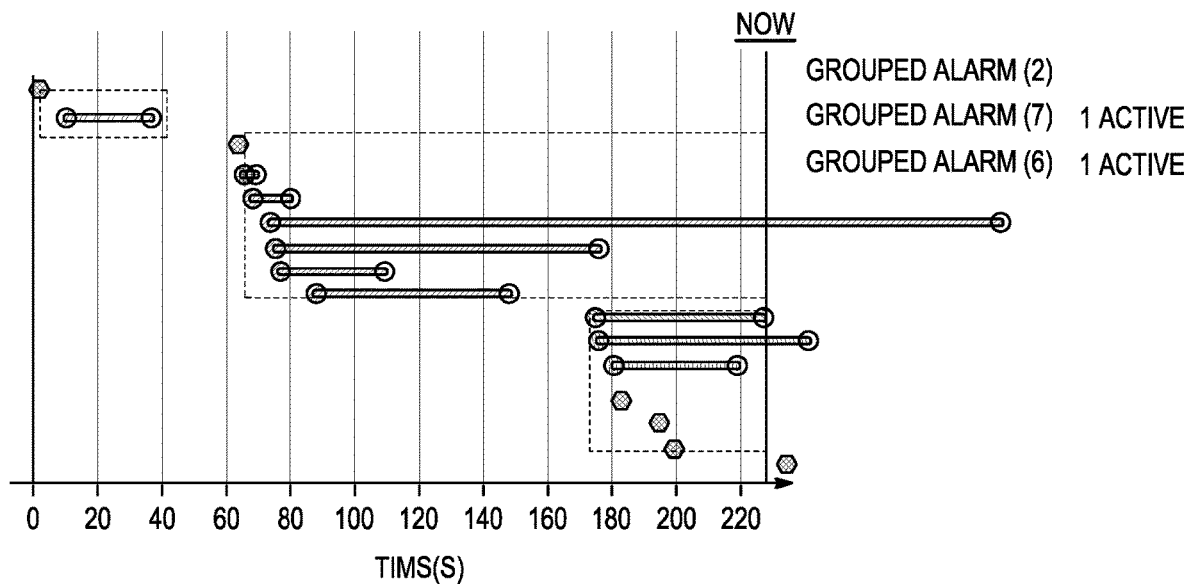
Figure 8A:
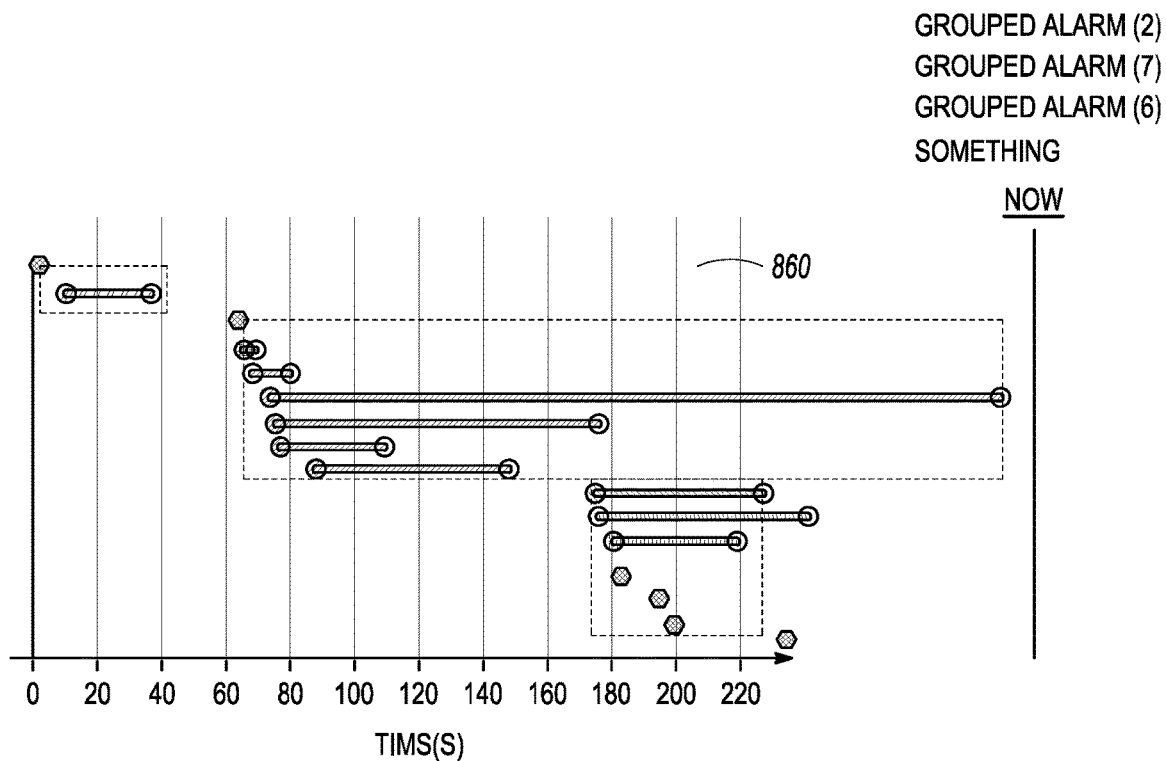
Figure 8B:
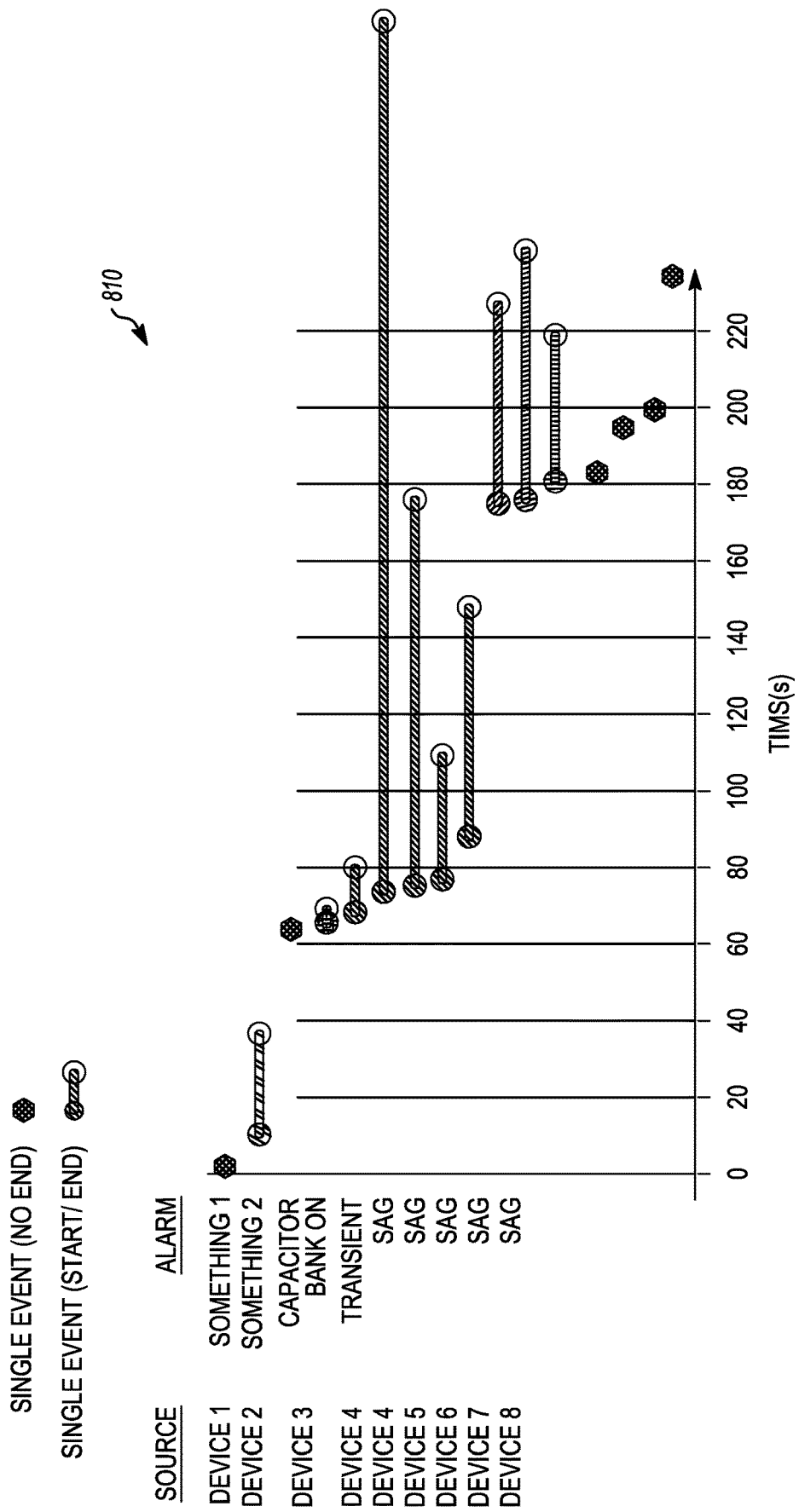
Figure 8C:
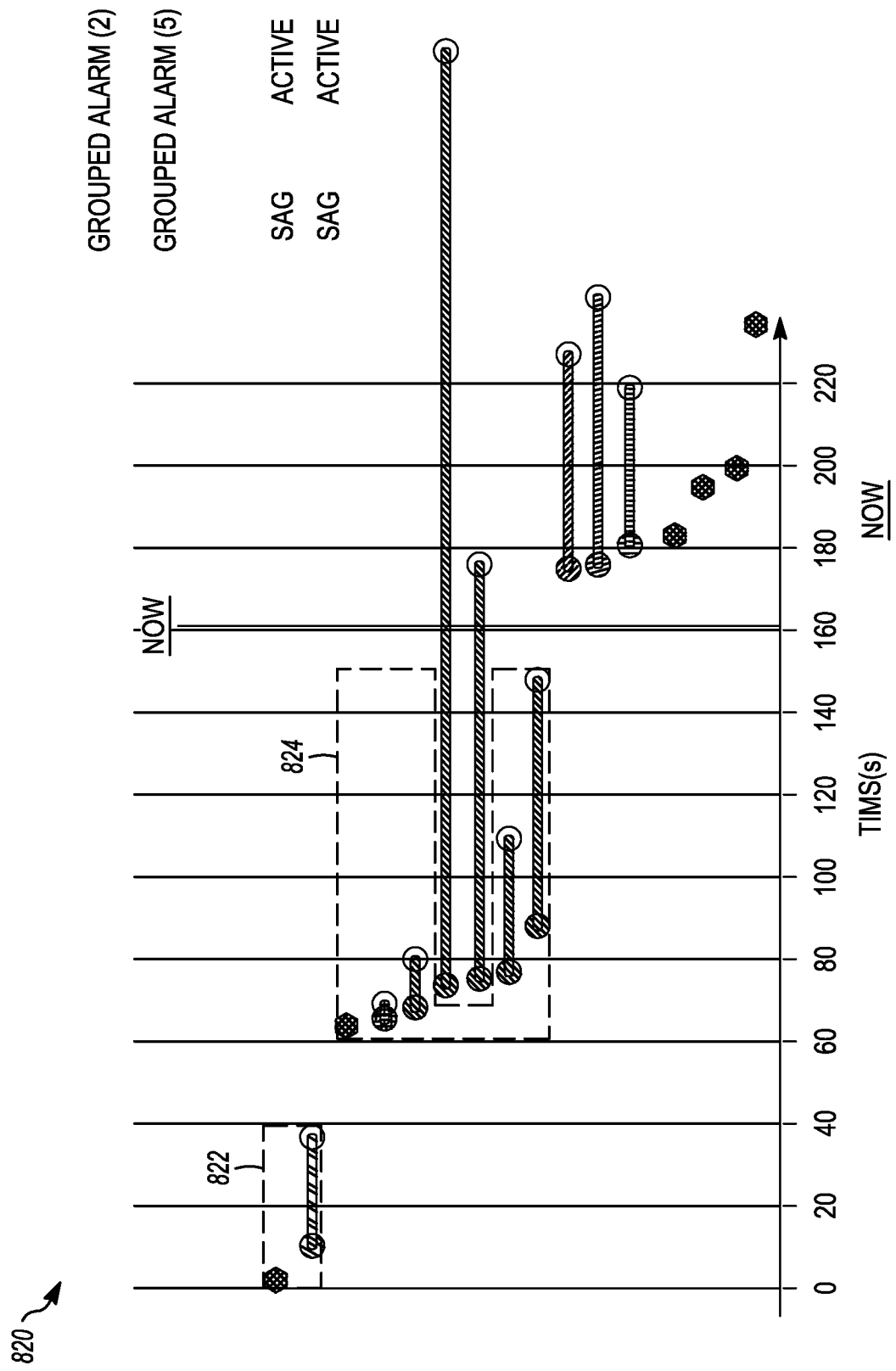
Figure 8D:
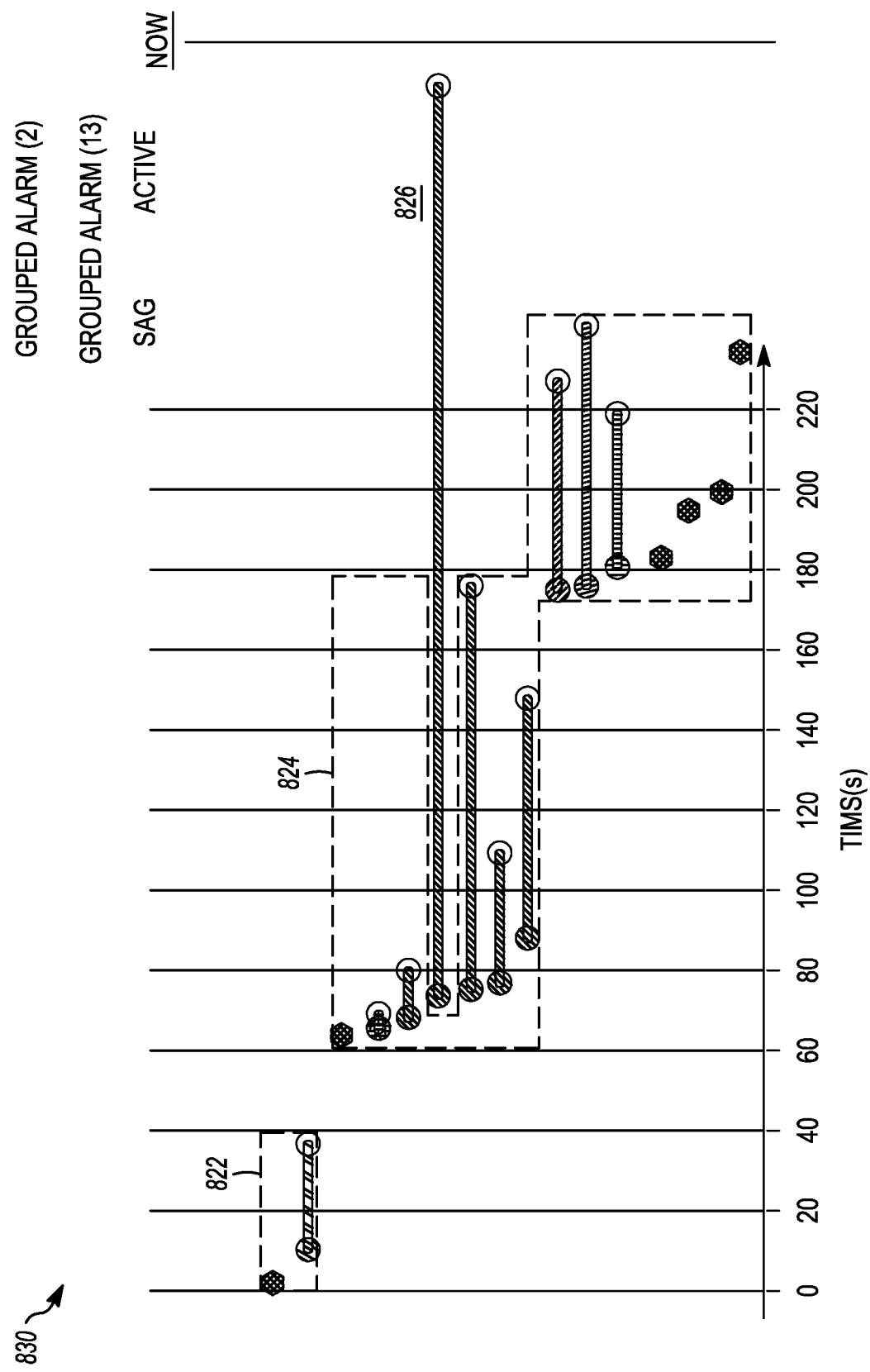

FIGS. 8A through 8E are graphs illustrating examples of two possible near real-time alarm aggregation mechanisms of real events (e.g., Alarm Events) which show the group formation over time in accordance with an exemplary embodiment of the present disclosure. As shown in FIG. 8A, an Alarm Event will either need to wait to get an event end time to be considered for group integration as illustrated by the sequence 800 of operations, or it may be grouped on-the fly if we use the event start time overlap with other current events into the same group 850. An enlarged view of the graphical representation 810 is shown in FIG. 8B. As shown in FIG. 8B, this example illustrates a plurality of Alarm Events from at least eight different sources (e.g., Devices 1 through 8) that are evaluated and aggregated.

Figure 8E:
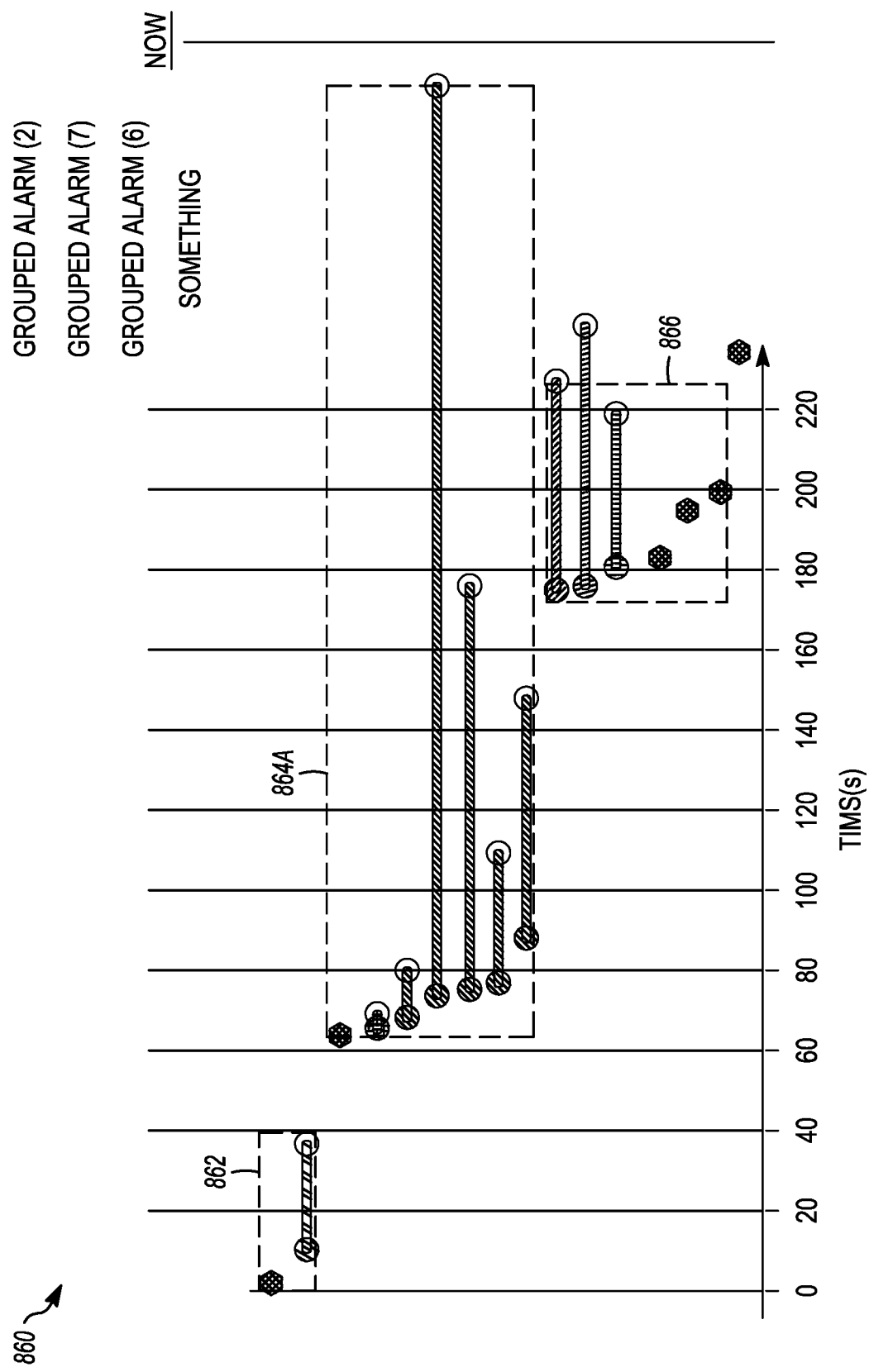

In the sequence 800, as time passes the end time stamp of an event, this Alarm Event, which is overlapping in time with other events which already ended earlier, is then grouped together into a "sequence of overlapping events" (SoOE). For example, as shown in graphical representation 820 (which has been enlarged in FIG. 8C) at time 160, certain Alarm events have been aggregated into two groups 822 and 824 (e.g., events overlapping in time). As time passes over the sequence 800, all of the Alarm Events are eventually aggregated into a group such as shown in the graphical representation 830 (which is enlarged in FIG. 8D). In this example, one of the Alarm Events continues for a longer period, exceeding some other time related grouping condition, and thus, may be placed into its own group 826 or not grouped at all. The aggregation process in the sequence 800 uses one set of criterion for initiating grouping Alarm Events: The end of event time stamp. Other sets of different criterion may be used such as using the start time of events and other duration conditions, which may result in a different grouping for the same set of Alarm Events (e.g., shown by a sequence 850 of graphical representation for the same set of Alarm Events shown in graphical representation 810 in FIG. 8B). For example, FIG. 8E illustrates an enlarged view of graphical representation 860 for the sequence 850 in which the Alarm Events may be grouped into a different combination of groups 862, 864A and 866. These and other criterion may be included or adjusted according to the system and sub-systems to be monitored.

In various embodiments, a predefined or calculated or derived extra time duration may be applied before or after one or more of the events or aggregated groups of events to account for time alignment when grouping events (which may overlap in time) according to the time and duration, such as in various examples discussed herein.

FIG. 9 illustrates an example of an implementation of the events aggregation inside a monitoring application (e.g., the Power Monitoring Expert 9.0 software) showing a report 900 of an Incident History such as for example of power quality (PQ) Incidents, in accordance with an embodiment. As shown in the report 1000, a list of Incidents is provided in the report including the type of Incident, their associated grouping of Alarms or Alarm events and the duration of the Incident (e.g., instantaneous or time in seconds). The types of PQ Incidents may include for example sag, swell, transient and so forth. The Alarms may be identified by their source or location. The report 900 may be generated for a particular time period and/or location in the electrical/power system or facility, either automatically or in response to a user or system command.

IV. Example Computer System and Other Architecture

Figure 10:
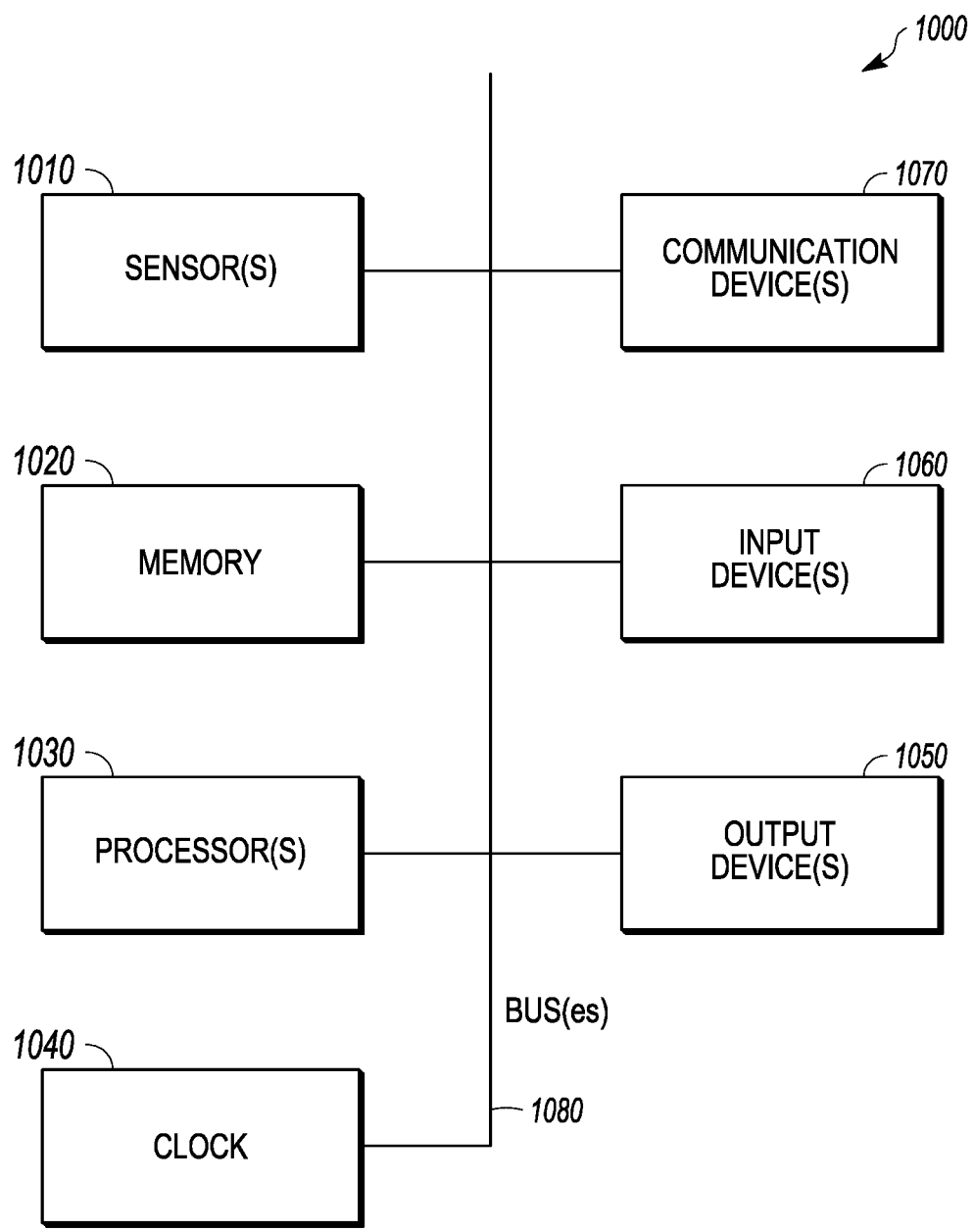
FIG. 10 illustrates a block diagram of example components of a general computer system in accordance with an exemplary embodiment of the present disclosure.

As shown in FIG. 10, an example computer system 1000 may include for example one or more sensors 1010, memory 1020, processor(s) 1030, clock 1040, output device 1050, input device 1060, communication device 1070, and a bus system 1080 between the components of the computer system. In various embodiments, the sensors 1010 may be configured to sense voltage and/or current and/or other measurable and/or derivable electrical property from power lines on an electrical/power system. The sensors 1010 may include signal processing and conditioning circuitry to measure energy-related signals (e.g., voltage or current signal waveforms) which are representative of the voltage and/or current and/or other measurable and/or derivable electrical property on the electrical/power system. The clock 1040 may be used to time-stamp measurement data, event data, event profile data, or other types of data which is measured, calculated, captured, stored or generated by the computer system 1000 or devices connected thereto.

The memory 1020 may store computer executable code, programs, software or instructions that may control the operations when executed, such as described herein. The memory 1020 may also store other data used by the computer system 1000 or components thereof to perform the operations described herein. The other data may include but is not limited to a digital repository of typical power events (e.g., power quality events, typical power events, atypical power events or other related events), a digital repository of typical event groups or Incidents and/or of alarm groups, a digital repository of time stamped status(es) and/or measurement data (e.g., captured waveforms, parameters and thresholds, and other data discussed herein). The memory may also include a temporary storage (e.g., buffer(s)) to enable continuous logging of measurement data so that a desired period of measurement data, such as waveforms, may be measured, derived, captured and stored.

The input devices 1060 and output devices 1050, for example, may include a keyboard or pad, mouse, trackball, microphone, touch screen, a printing device, display screen, speaker, etc. For example, the output device may render information for external presentation (e.g., a display device) and input devices may accept information from external sources (e.g., users and other systems).

The processor(s) 1030, which interacts with the other components of the system, is configured to control or implement the various operations of the computer system, described herein. These operations may include monitoring electrical properties on an electrical/power system, detecting and tracking events, aggregating events, waveform capture (WFC), event analysis, event profile creation and performing other operations (e.g., metering, alarms, reporting, power interruption, equipment control, and so forth).

The above are simply example components of a general computer system 1000. The computer system 1000 may include different combination of components, and may be a computer, server, a network node, a control node, an intelligent electronic device (IED, e.g., a smart power meter, smart circuit breaker or other smart power equipment), or other computer or smart systems or devices that may report event data to other computer systems and devices (e.g., a control node or central monitoring system on the network) for further analysis and action (e.g., control or monitor the power system).

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and may be given a different name or label. The use of the term "or" is not limited to exclusive "or", but may also mean "and/or". The use of the slash symbol "/" may mean "or" or "and/or".

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

A processor(s) or controller(s) as described herein may be a processing system, which may include one or more processors, such as CPU, GPU, controller, FPGA (Field Programmable Gate Array), ASIC (Application-Specific Integrated Circuit) or other dedicated circuitry or other processing unit, which controls the operations of the devices or systems, described herein. Memory/storage devices may include, but are not limited to, disks, solid state drives, optical disks, removable memory devices such as smart cards, SIMs, WIMs, semiconductor memories such as RAM, ROM, PROMS, etc. Transmitting mediums or networks include, but are not limited to, transmission via wireless communication (e.g., Radio Frequency (RF) communication, Bluetooth®, Wi-Fi, Li-Fi, etc.), the Internet, intranets, telephone/modem-based network communication, hardwired/cabled communication network, satellite communication, and other stationary or mobile network systems/communication links.

Furthermore, the capture, analysis, profile creation, reporting and other operations may be performed at a network node, such as a power meter or other equipment associated with or on the power distribution network, or performed across multiple network nodes in a distributed and hierarchical fashion to facilitate monitoring and analysis of power quality throughout the electrical/power system (e.g., utility and facilities) and to implement reporting and actions accordingly to improve or maintain the power quality.

While particular embodiments and applications of the present disclosure have been illustrated and described, it is to be understood that the present disclosure is not limited to the precise construction and compositions disclosed herein and that various modifications, changes, and variations may be apparent from the foregoing descriptions without departing from the invention as defined in the appended claims.

The invention claimed is:

1. A computer-implemented method of creating and analyzing grouped events, comprising:
    obtaining, at a network node, event data of measured real events detected at one or more locations of a monitored electrical/power system according to a first criterion, the event data for each real event defining one or more parameters/dimensions of the real event, the real events comprising power events which are detected from one or more monitored electrical properties on the monitored system;
    aggregating the detected real events into groups according to at least one or more parameters/dimensions of the detected real events; and
    analyzing one or more of the aggregated groups of detected real events to identify conditions on the monitored system or take action when a condition is identified on the monitored system from the one or more aggregated groups of detected real events,
    wherein the detected real events are aggregated into groups according to a time and duration of the detected real events, the aggregating operation comprising:
    identifying time overlapping events from the detected real events; and
    grouping the time overlapping events together to form one or more event groups each having event group data defining one or more parameters/dimensions of the event group, the event groups comprising a sequence of time overlapping events in which each of the time overlapping events for an event group overlaps in time with at least one other time overlapping event in the same event group.

2. The method of claim 1, wherein the detected real events include an alarm event from an intelligent electronic device or other power equipment.

3. The method of claim 1, wherein the parameters/dimensions of a real event include at least one of identification information of a time of occurrence or duration of an event, or an energy measurement or a derived or calculated characteristic or value of the event, or a criticality of an event, or a type of an event including a type of power quality event.

4. The method of claim 1, wherein the detected real events further include a monitored system event.

5. The method of claim 1, wherein the aggregating operation further comprises:
applying a predefined or calculated or derived extra time duration before or after one or more of the detected real events or aggregated groups of detected real events to account for time alignment when grouping events according to the time and duration.

6. The method of claim 1, wherein the one or more groups are displayed in graphical form on a timeline.

7. The method of claim 1, further comprising:
detecting and tracking an occurrence of a real event using an intelligent electronic device or other power equipment at a location in the monitored system according to the first criterion, the first criterion being an event threshold or condition; and
generating event data which defines one or more parameters/dimensions of the detected real event.

8. The method of claim 1, further comprising:
supplementing the event data for the detected real event with additional event data collected or measured or derived by an intelligent electronic device or other power equipment.

9. The method of claim 1, wherein event data of detected real events are obtained from a plurality of different sources comprising at least a plurality of intelligent electronic devices or other power equipment arranged to monitor energy measurements on the monitored system at different locations.

10. The method of claim 1, wherein the event data includes textual data describing one or more parameters/dimensions of the detected real event, the method further comprising:
converting the textual data from the event data of each detected real event or from additional event data collected or measured or derived by an intelligent electronic device or other power equipment, to a matching label from a library of unique and non-ambiguous event labels identifying one or more parameters/dimensions associated with one or more of the detected real events prior to aggregating the detected real events.

11. The method of claim 10, further comprising:
identifying any new string of text related to one or more of the detected real events or to additional data from the detected real events and group of detected real events to enrich the library.

12. The method of claim 10, wherein the converting the textual data comprises:
extracting discriminant parameters/dimensions from the textual data of a detected real event; and
creating new event data labels to add to the library for the detected real event, which comprises tagged event labels for each of the extracted discriminant parameters/dimensions.

13. The method of claim 1, wherein the action to be taken comprises shutting down one or more electrical equipment in the monitored system, selectively interrupting power at one or more locations in the monitored system, postponing or changing the order of a process sequence, or generating an alarm or report.

14. A system for creating and analyzing grouped events, comprising:
a memory; and
one or more processors configured:
to obtain, at a network node, event data of measured real events detected at one or more locations of a monitored electrical/power system according to a first criterion, the event data for each real event defining one or more parameters/dimensions of the real event, the real events comprising power events which are detected from one or more monitored electrical properties on the monitored system,
to aggregate the detected real events into groups according to at least one or more parameters/dimensions of the detected real events, and
to analyze one or more of the aggregated groups of detected events to identify conditions on the monitored system or take action when a condition on the monitored system is identified from the one or more aggregated groups of detected events,
wherein the detected real events are aggregated into groups according to a time and duration of the detected real events, the aggregating operation comprising:
identifying time overlapping events from the detected real events; and
grouping the time overlapping events together to form one or more event groups each having event group data defining one or more parameters/dimensions of the event group, the event groups comprising a sequence of time overlapping events in which each of the time overlapping events for an event group overlaps in time with at least one other time overlapping event in the same event group.

15. The system of claim 14, wherein the detected real events include an alarm event from a power meter or other power equipment.

16. The system of claim 14, wherein the parameters/dimensions of a real event include at least one of identification information of a time of occurrence or duration of an event, or an energy measurement or a derived or calculated characteristic or value of the event, or a criticality of an event, or a type of an event including a type of power quality event.

17. The system of claim 14, wherein the detected real events further include a monitored system event.

18. The system of claim 14, wherein to aggregate the detected real events the one or more processors being further configured:
to apply a predefined or calculated or derived extra time duration before or after one or more of the detected real events or aggregated groups of detected real events to account for time alignment when grouping events according to the time and duration.

19. The system of claim 14, wherein the one or more groups are displayed in graphical form on a timeline.

20. The system of claim 14, wherein the one or more processors are further configured:

to detect and track an occurrence of a real event using an intelligent electronic device or other power equipment at a location in the monitored system according to the first criterion, the first criterion being an event threshold or condition; and to generate event data which defines one or more parameters/dimensions of the detected real event.

21. The system of claim 14, wherein the one or more processors are further configured:

to supplement the event data for the detected real event with additional event data collected or measured or derived by an intelligent electronic device or other the power equipment.

22. The system of claim 14, wherein event data of detected real events are obtained from a plurality of different sources comprising at least a plurality of intelligent electronic devices or other power equipment arranged to monitor energy measurements on the monitored system at different locations.

23. The system of claim 14, wherein the event data includes textual data describing one or more parameters/dimensions of the detected real event, the one or more processors being configured:

to convert the textual data from the event data of each detected real event or from additional event data collected or measured or derived by an intelligent electronic device or other power equipment, to a matching label from a library of unique and non-ambiguous event labels identifying one or more parameters/dimensions associated with one or more of the detected real events prior to aggregating the detected real events.

24. The system of claim 23, wherein the one or more processors are further configured:

to identify any new string of text related to one or more of the detected real events or to additional data from the detected real events and group of detected real events to enrich the library.

25. The system of claim 23, wherein, to convert the textual data, the one or more processors are configured:

to extract discriminant parameters/dimensions from the textual data of a detected real event; and to create new event data labels to add to the library for the detected real event, which comprises tagged event labels for each of the extracted discriminant parameters/dimensions.

26. The system of claim 14, wherein the action to be taken comprises shutting down one or more electrical equipment in the monitored system, selectively interrupting power at one or more locations in the monitored system, postponing or changing the order of a process sequence, or generating an alarm or report.

27. A tangible computer medium storing computer executable code, which when executed by a processor, is configured to implement a method of creating and analyzing grouped events, the method comprising:

obtaining, at a network node, event data of measured real events detected at one or more locations of a monitored electrical/power system according to a first criterion, the event data for each real event defining one or more parameters/dimensions of the real event, the real events comprising power events which are detected from one or more monitored electrical properties on the monitored system;

aggregating the detected real events into groups according to at least one or more parameters/dimensions of the detected real events; and analyzing one or more of the aggregated groups of detected real events to identify conditions on the monitored system or take action when a condition on the monitored system is identified from the one or more aggregated groups of detected real events, wherein the detected real events are aggregated into groups according to a time and duration of the detected real events, the aggregating operation comprising:

identifying time overlapping events from the detected real events; and grouping the time overlapping events together to form one or more event groups each having event group data defining one or more parameters/dimensions of the event group, the event groups comprising a sequence of time overlapping events in which each of the time overlapping events for an event group overlaps in time with at least one other time overlapping event in the same event group.

28. The method of claim 1, wherein the aggregating and analyzing operations are performed automatically.

29. The method of claim 1, wherein the identified condition(s) comprises a power quality disturbance or an anomaly on the monitored system, and a cause of the power quality disturbance or the anomaly on the monitored system.

30. A computer-implemented method of creating and analyzing grouped events, comprising:

obtaining, at a network node, event data of measured real events detected at one or more locations of a monitored electrical/power system according to a first criterion, the event data for each real event defining one or more parameters/dimensions of the real event, the real events comprising power events which are detected from one or more monitored electrical properties on the monitored system;

aggregating the detected real events into groups according to at least a time and duration of the detected real events, the aggregation including: identifying time overlapping events from the detected real events, and grouping the time overlapping events together to form one or more event groups each having event group data defining one or more parameters/dimensions of the event group, the event groups comprising a sequence of time overlapping events in which each of the time overlapping events for an event group overlaps in time with at least one other time overlapping event in the same event group; and analyzing one or more of the aggregated groups of detected real events to identify conditions on the monitored system or take action when a condition is identified on the monitored system from the one or more aggregated groups of detected real events.

\* \* \* \* \*